United States Patent
Liu et al.

(10) Patent No.: US 10,895,458 B2
(45) Date of Patent: Jan. 19, 2021

(54) METHOD, APPARATUS, AND SYSTEM FOR DETERMINING A MOVEMENT OF A MOBILE PLATFORM

(71) Applicant: SZ DJI TECHNOLOGY CO., LTD., Shenzhen (CN)

(72) Inventors: Ang Liu, Shenzhen (CN); Jiaqi Yan, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 258 days.

(21) Appl. No.: 15/863,646

(22) Filed: Jan. 5, 2018

(65) Prior Publication Data

US 2018/0128620 A1 May 10, 2018

Related U.S. Application Data

(63) Continuation of application No. PCT/CN2015/083971, filed on Jul. 14, 2015.

(51) Int. Cl.
*G01C 21/16* (2006.01)
*G01P 3/38* (2006.01)
*G01S 19/48* (2010.01)
*G01S 5/02* (2010.01)

(52) U.S. Cl.
CPC .............. *G01C 21/165* (2013.01); *G01P 3/38* (2013.01); *G01S 5/0263* (2013.01); *G01S 19/48* (2013.01)

(58) Field of Classification Search
CPC ...... G01C 21/165; G01C 21/32; G01C 21/28; G01C 21/30; G01C 19/00; G01C 25/00; G01C 25/005; G01C 21/16; G01C 21/20; G01P 3/38; G01P 5/00; G01S 5/0263; G01S 5/0257
See application file for complete search history.

(56) References Cited

U.S. PATENT DOCUMENTS

| | | | | |
|---|---|---|---|---|
| 7,417,745 B2* | 8/2008 | Haidner | ..................... | G01J 9/04 |
| | | | | 356/515 |
| 7,469,183 B2* | 12/2008 | Bodin | .................. | G05D 1/0027 |
| | | | | 701/23 |
| 7,489,806 B2* | 2/2009 | Mohri | ..................... | G06F 3/014 |
| | | | | 382/103 |

(Continued)

FOREIGN PATENT DOCUMENTS

CN 101403620 A 4/2009
CN 201331348 Y 10/2009
(Continued)

OTHER PUBLICATIONS

The World Intellectual Property Organization (WIPO) International Search Report and Written Opinion for PCT/CN2015/083971 dated Apr. 13, 2016 9 Pages.

(Continued)

*Primary Examiner* — Hunter B Lonsberry
*Assistant Examiner* — Luis A Martinez Borrero
(74) *Attorney, Agent, or Firm* — Anova Law Group, PLLC

(57) ABSTRACT

An apparatus and system for determining a movement of a mobile platform and methods for making and using same are provided. The method includes obtaining an error contribution value for a measurement of the movement of the mobile platform and estimate an error of the measurement based upon the obtained error contribution value.

19 Claims, 13 Drawing Sheets

(56) References Cited

U.S. PATENT DOCUMENTS

| | | | |
|---|---|---|---|
| 8,213,706 B2* | 7/2012 | Krishnaswamy | G06T 7/33 382/154 |
| 8,447,116 B2* | 5/2013 | Ma | G01S 5/16 382/195 |
| 8,498,447 B2 | 7/2013 | Derbanne | |
| 8,948,935 B1 | 2/2015 | Peeters et al. | |
| 9,213,938 B2* | 12/2015 | Mehta | G06K 9/78 |
| 9,235,215 B2* | 1/2016 | Qian | G06K 9/6284 |
| 9,275,463 B2* | 3/2016 | Nanri | G01C 3/085 |
| 9,418,284 B1* | 8/2016 | Houri | H04W 4/029 |
| 9,911,190 B1* | 3/2018 | Houri | G06F 16/22 |
| 10,311,833 B1* | 6/2019 | Qiu | G02B 27/0179 |
| 10,387,727 B2* | 8/2019 | Abeywardena | G01C 21/32 |
| 10,527,423 B1* | 1/2020 | Pavlyuk | G06T 7/70 |
| 2002/0171844 A1* | 11/2002 | Hill | G03F 7/70775 356/500 |
| 2003/0214448 A1* | 11/2003 | Downs | H01Q 1/185 343/757 |
| 2005/0007602 A1* | 1/2005 | Haidner | G01J 9/04 356/521 |
| 2005/0232467 A1* | 10/2005 | Mohri | G06F 3/0304 382/103 |
| 2006/0123050 A1* | 6/2006 | Carmichael | G06K 9/00885 |
| 2006/0167622 A1* | 7/2006 | Bodin | G05D 1/104 701/467 |
| 2008/0033645 A1 | 2/2008 | Levinson et al. | |
| 2008/0144925 A1* | 6/2008 | Zhu | G06K 9/32 382/154 |
| 2008/0195316 A1 | 8/2008 | Krishnaswamy | |
| 2008/0243372 A1* | 10/2008 | Bodin | G08G 5/0069 701/23 |
| 2009/0154791 A1* | 6/2009 | Yoon | G06K 9/00664 382/153 |
| 2009/0187299 A1 | 7/2009 | Fregene et al. | |
| 2009/0263009 A1* | 10/2009 | Krishnaswamy | G05D 1/0253 382/154 |
| 2010/0010741 A1* | 1/2010 | Tener | G01S 5/163 701/500 |
| 2010/0030470 A1 | 2/2010 | Wang et al. | |
| 2010/0250133 A1 | 9/2010 | Buros | |
| 2010/0265126 A1 | 10/2010 | Mao | |
| 2012/0007943 A1* | 1/2012 | Tytgat | G01B 11/22 348/14.08 |
| 2013/0107039 A1* | 5/2013 | Mehta | G06K 9/6215 348/135 |
| 2013/0182906 A1* | 7/2013 | Kojo | G06T 7/521 382/103 |
| 2014/0152780 A1* | 6/2014 | Kanetake | H04N 13/282 348/50 |
| 2014/0241577 A1* | 8/2014 | Kwak | G06T 7/277 382/103 |
| 2014/0334547 A1* | 11/2014 | Knee | H04N 19/56 375/240.16 |
| 2014/0334675 A1* | 11/2014 | Chu | G06T 7/73 382/103 |
| 2015/0036917 A1* | 2/2015 | Nanri | G06T 7/593 382/154 |
| 2015/0145954 A1* | 5/2015 | Pulleti | B64C 39/02 348/46 |
| 2015/0268058 A1* | 9/2015 | Samarasekera | G08G 5/0073 701/409 |
| 2016/0148392 A1* | 5/2016 | Hepper | G06T 7/207 382/107 |
| 2016/0273921 A1* | 9/2016 | Zhou | G05D 1/101 |
| 2017/0004379 A1* | 1/2017 | Ramalingam | G06T 7/20 |
| 2017/0039765 A1* | 2/2017 | Zhou | G06T 7/55 |
| 2017/0123425 A1* | 5/2017 | Zhao | G06K 9/0063 |
| 2017/0219716 A1* | 8/2017 | Niesen | G01S 19/426 |
| 2017/0277197 A1* | 9/2017 | Liao | G06T 7/20 |
| 2017/0300780 A1* | 10/2017 | Baba | G06K 9/00805 |
| 2017/0323459 A1* | 11/2017 | Ermilios | G06T 7/80 |
| 2017/0329324 A1* | 11/2017 | Bachrach | B64C 39/024 |
| 2017/0357873 A1* | 12/2017 | Roimela | G06T 7/001 |
| 2018/0184115 A1* | 6/2018 | Knee | H04N 19/56 |
| 2018/0266830 A1* | 9/2018 | Kato | G06T 7/246 |
| 2020/0202729 A1* | 6/2020 | Tam | G08G 5/0043 |

FOREIGN PATENT DOCUMENTS

| | | |
|---|---|---|
| CN | 101867868 A | 10/2010 |
| CN | 101950027 A | 1/2011 |
| CN | 102298070 A | 12/2011 |
| CN | 103365295 A | 10/2013 |
| CN | 103487822 A | 1/2014 |
| CN | 103697889 A | 4/2014 |
| CN | 103759730 A | 4/2014 |
| CN | 103913588 A | 7/2014 |
| CN | 104197928 A | 12/2014 |
| CN | 104398248 A | 3/2015 |
| JP | 2009074859 A | 4/2009 |
| WO | 2015085483 A1 | 6/2015 |

OTHER PUBLICATIONS

Jian Li et al., Motion State Estimation for Micro UAV Using Inertial Sensor and Stereo Camera Pair, Acta Aeronautica et Astronautica Sinica, vol. 32, No. 12, Dec. 25, 2011 (Dec. 25, 2011), ISSN: 1000-6893.

* cited by examiner

METHOD, APPARATUS, AND SYSTEM FOR DETERMINING A MOVEMENT OF A MOBILE PLATFORM

CROSS-REFERENCE TO RELATED APPLICATION

This is a continuation application of International Application No. PCT/CN2015/083971, filed on Jul. 14, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile platforms and more particularly, but not exclusively, to methods, apparatuses, and systems for determining a movement of a mobile platform.

BACKGROUND

Mobile platforms, such as manned and unmanned vehicles, can be used for performing surveillance, reconnaissance, and exploration tasks for military and civilian applications. For example, an unmanned aerial vehicle (UAV) may be outfitted with a functional payload, such as a sensor for collecting data from the surrounding environment or a substance to be delivered to a destination.

Accurately measuring a movement of a mobile platform is important for effectively controlling the mobile platform. For example, to perform selected tasks, it may be desirable to place a UAV in a hovering state in which the UAV suspends in air without a change of position. Exemplary tasks include capturing images of a target object or spraying a pesticide onto a target location. In the hovering state, any movement of the UAV is measured so that a controller can manipulate the UAV to compensate for the movement. In one example, when a speed of the UAV is detected to be non-zero, the controller can control the UAV to adjust the speed to be zero. In another example, when a position of the UAV is detected to have deviated from a desired hovering position, the controller can move the UAV to the desired position.

Existing techniques for measuring a movement of mobile platforms are often time-consuming and lack accuracy. When the movement is not accurately measured, the mobile platform may not be able to perform a required task. Further, control of the mobile platform can fail, which may result in the mobile platform being involved in an accident.

In view of the foregoing, there is a need for method, apparatus, and system for determining a movement of a mobile platform that overcomes the aforementioned obstacles and deficiencies of currently-available techniques for measuring mobile platform movement.

SUMMARY

The present disclosure relates to an apparatus and system for determining a movement of a mobile platform and methods for making and using same.

In accordance with a first aspect disclosed herein, there is set forth a method for determining a movement of a mobile platform, including:
obtaining an error contribution value for a first measurement of the movement; and
estimating an error of the first measurement based upon the obtaining.

In some embodiments of the disclosed method, the estimating includes estimating the error of the first measurement according to a correlation between the error and the error contribution value.

In some embodiments of the disclosed method, the method further includes determining the movement of the mobile platform by combining the first measurement with a second measurement of the movement of the mobile platform based on the error of the first measurement.

In some embodiments of the disclosed method, the method further includes generating the first measurement by identifying a matching feature point pair including a first feature point of an object based upon a first image of the object captured at a first time and a second feature point of the object based upon a second image of the object captured at a second time.

In some embodiments of the disclosed method, the first time is different from the second time, the generating the first measurement including measuring the movement of the mobile platform between the first time and the second time based on a relationship between the first feature point and the second feature point within the matching feature point pair.

In some embodiments of the disclosed method, the estimating includes estimating the error of the first measurement according to the correlation, the correlation being independent of an error distribution parameter of a coordinate of the first feature point.

In some embodiments of the disclosed method, the estimating includes estimating the error of the first measurement according to the correlation, and the correlation is independent of a coordinate of the first feature point.

In some embodiments of the disclosed method, the obtaining includes obtaining the error contribution value correlated with a distance between the object and the mobile platform.

In some embodiments of the disclosed method, the obtaining includes obtaining the error contribution value including a binocular disparity associated with the first feature point.

In some embodiments of the disclosed method, the obtaining includes obtaining the error contribution value including the binocular disparity generated based upon two sub-images associated with the first feature point.

In some embodiments of the disclosed method, the obtaining includes obtaining the error contribution value including the binocular disparity generated based upon the two sub-images captured simultaneously by respective two imaging devices.

In some embodiments of the disclosed method, the estimating includes estimating the error of the first measurement as increasing linearly with a reciprocal of a square of the binocular disparity.

In some embodiments of the disclosed method, the generating the first measurement includes:
identifying a plurality of matching feature point pairs each including a respective selected first feature point and a corresponding second feature point; and
measuring the movement of the mobile platform between the first time and the second time based upon a relationship between the respective selected first feature point and the corresponding second feature point within a selected inlier feature point pair selected from the plurality of matching feature point pairs.

In some embodiments of the disclosed method, the generating the first measurement includes selecting one or more inlier feature point pairs from the plurality of matching feature point pairs.

In some embodiments of the disclosed method, the obtaining includes obtaining the error contribution value including a number of the one or more inlier feature point pairs.

In some embodiments of the disclosed method, the estimating includes estimating the error of the first measurement as increasing linearly with a reciprocal of the number of the one or more inlier feature point pairs.

In some embodiments of the disclosed method, the generating the first measurement includes:

obtaining a sample movement value based on each of the respective matching feature point pairs; and measuring the movement of the mobile platform based on the sample movement value provided by the most matching feature point pairs of the plurality of matching feature point pairs, and the most matching feature point pairs are the one or more inlier feature point pairs.

In some embodiments of the disclosed method, the generating the first measurement includes measuring a displacement of the mobile platform between the first time and the second time.

In some embodiments of the disclosed method, the generating the first measurement includes measuring a speed of the mobile platform between the first time and the second time.

In some embodiments of the disclosed method, the estimating includes estimating a covariance matrix associated with the first measurement.

In some embodiments of the disclosed method, the method further includes generating the second measurement using an inertial measurement unit.

In some embodiments of the disclosed method, the estimating includes estimating the error of the first measurement for determining the movement of an Unmanned Aerial Vehicle (UAV).

In accordance with another aspect disclosed herein, there is set forth an apparatus for determining a movement of a mobile platform, including a processor configured to:

obtain an error contribution value for a first measurement of the movement; and estimate an error of the first measurement based upon the obtaining.

In some embodiments of the disclosed apparatus, the processor is configured to estimate the error of the first measurement according to a correlation between the error and the error contribution value.

In some embodiments of the disclosed apparatus, the processor is configured to provide the error for determining the movement of the mobile platform by combining the first measurement with a second measurement of the movement of the mobile platform based on the error of the first measurement.

In some embodiments of the disclosed apparatus, the first measurement includes identifying a matching feature point pair including a first feature point of an object based upon a first image of the object captured at a first time and a second feature point of the object based upon a second image of the object captured at a second time.

In some embodiments of the disclosed apparatus, the first time being different from the second time, a relationship between the first feature point and the second feature point within the matching feature point pair providing the movement of the mobile platform between the first time and the second time.

In some embodiments of the disclosed apparatus, the correlation between the error and the error contribution value is independent of an error distribution parameter of a coordinate of the first feature point.

In some embodiments of the disclosed apparatus, the correlation between the error and the error contribution value is independent of a coordinate of the first feature point.

In some embodiments of the disclosed apparatus, the processor is configured to obtain the error contribution value correlated with a distance between the object and the mobile platform.

In some embodiments of the disclosed apparatus, the error contribution value includes a binocular disparity associated with the first feature point.

In some embodiments of the disclosed apparatus, the binocular disparity is generated based upon two sub-images associated with the first feature point.

In some embodiments of the disclosed apparatus, the two sub-images are captured simultaneously by respective two imaging devices.

In some embodiments of the disclosed apparatus, the processor is configured to estimate the error of the first measurement as increasing linearly with a reciprocal of a square of the binocular disparity.

In some embodiments of the disclosed apparatus, wherein:

the first measurement includes:

identifying a plurality of matching feature point pairs, wherein each matching feature point pair includes a respective selected first feature point and a corresponding second feature point; and measuring the movement of the mobile platform between the first time and the second time based upon a relationship between the respective selected first feature point and the corresponding second feature point within any of one or more inlier feature point pairs selected from the plurality of matching feature point pairs; and the error contribution value includes a number of the one or more inlier feature point pairs.

In some embodiments of the disclosed apparatus, the processor is configured to estimate the error of the first measurement as increasing linearly with a reciprocal of the number of the one or more inlier feature point pairs.

In some embodiments of the disclosed apparatus, the first measurement includes:

obtaining a sample movement value based on each matching feature point pair of the plurality of matching feature point pairs, respectively; and measuring the movement of the mobile platform based on the sample movement value provided by the most matching feature point pairs of the plurality of matching feature point pairs, and the most matching feature point pairs are the one or more inlier feature point pairs.

In some embodiments of the disclosed apparatus, the first measurement includes measuring a displacement of the mobile platform between the first time and the second time.

In some embodiments of the disclosed apparatus, the first measurement includes measuring a speed of the mobile platform between the first time and the second time.

In some embodiments of the disclosed apparatus, the error of the first measurement includes a covariance matrix associated with the first measurement.

In some embodiments of the disclosed apparatus, the first measurement is generated by a first sensor, and the second measurement is generated by a second sensor being different from the first sensor.

In some embodiments of the disclosed apparatus, the first sensor includes a vision sensor.

In some embodiments of the disclosed apparatus, the second sensor includes an inertial measurement unit.

In some embodiments of the disclosed apparatus, the mobile platform includes an Unmanned Aerial Vehicle (UAV).

In accordance with another aspect disclosed herein, there is set forth an apparatus assembly for determining a movement of a mobile platform, including:

a vision sensor for generating a first measurement of the movement of a mobile platform; and the apparatus for determining a movement of a mobile platform, for estimating an error of the first measurement.

In accordance with another aspect disclosed herein, there is set forth an apparatus assembly for determining a movement of a mobile platform, including:

a vision sensor for generating a first measurement of the movement of a mobile platform;

the apparatus for determining a movement of a mobile platform, for estimating an error of the first measurement; and an inertial measurement unit for generating a second measurement of the movement of a mobile platform, the second measurement being combined with the first measurement based upon the error of the first measurement, to determine the movement of a mobile platform.

In accordance with another aspect disclosed herein, there is set forth an unmanned aerial vehicle (UAV), including the apparatus for determining a movement of a mobile platform.

In accordance with another aspect disclosed herein, there is set forth an unmanned aerial vehicle (UAV), including the apparatus assembly for determining a movement of a mobile platform.

In accordance with another aspect disclosed herein, there is set forth a kit for assembling an unmanned aerial vehicle (UAV), including the apparatus for determining a movement of a mobile platform.

In accordance with another aspect disclosed herein, there is set forth a kit for assembling an unmanned aerial vehicle (UAV), including the apparatus assembly for determining a movement of a mobile platform.

In accordance with another aspect disclosed herein, there is set forth a computer program product including instructions for determining the movement of the mobile platform in accordance with the method for determining a movement of a mobile platform.

In accordance with another aspect disclosed herein, there is set forth a method for estimating an error of measuring a movement of a mobile platform, including:

hypothesizing a correlation between an error contribution value and the error of measuring the movement, the correlation containing an unknown parameter;

collecting an experimental measurement value, a ground truth, and an error contribution value each corresponding to a test movement;

calculating an error of measuring the test movement based on the ground truth and the experimental measurement value; and fitting the hypothesized correlation to the error contribution value of the test movement and the error of measuring the test movement, to solve the unknown parameter.

In some embodiments of the method, the method further includes enabling the correlation to estimate the error of measuring the movement of the mobile platform based on the error contribution value of measuring the movement.

In some embodiments of the method, the method further includes collecting the experimental measurement value by identifying a matching feature point pair including a first feature point of an object based upon a first image of the object captured at a first time and a second feature point of the object based upon a second image of the object captured at a second time.

In some embodiments of the method, the first time is different from the second time, the collecting an experimental measurement value including measuring the test movement of the mobile platform between the first time and the second time based on a relationship between the first feature point and the second feature point within the matching feature point pair.

In some embodiments of the method, the hypothesizing includes hypothesizing the correlation independent of an error distribution parameter of a coordinate of the first feature point.

In some embodiments of the method, the hypothesizing includes hypothesizing the correlation independent of a coordinate of the first feature point.

In some embodiments of the method, the collecting includes collecting the error contribution value correlated with a distance between the object and the mobile platform.

In some embodiments of the method, the collecting includes collecting the error contribution value including a binocular disparity associated with the first feature point.

In some embodiments of the method, the hypothesizing includes hypothesizing the correlation in which the error of measuring the movement increases linearly with a reciprocal of a square of the binocular disparity.

In some embodiments of the method, the collecting the experimental measurement value includes:

identifying a plurality of matching feature point pairs each including a respective selected first feature point and a corresponding second feature point; and measuring the movement of the mobile platform between the first time and the second time based upon a relationship between the respective selected first feature point and the corresponding second feature point within a selected inlier feature point pairs selected from the plurality of matching feature point pairs, and the obtaining includes obtaining the error contribution value including a number of the one or more inlier feature point pairs.

In some embodiments of the method, the hypothesizing includes hypothesizing the correlation in which the error of measuring the movement increases linearly with a reciprocal of the number of the inlier feature point pairs.

In some embodiments of the method, the collecting the experimental measurement value includes:

obtaining a sample movement value based on each of the respective matching feature point pairs; and measuring the movement of the mobile platform based on the sample movement value provided by the most matching feature point pairs of the plurality of matching feature point pairs, and the most matching feature point pairs are the inlier feature point pairs.

In some embodiments of the method, the collecting the experimental measurement value includes measuring a displacement of the mobile platform between the first time and the second time.

In accordance with another aspect disclosed herein, there is set forth a computer program product including instructions for estimating an error of measuring a movement of a mobile platform.

Figure 1:
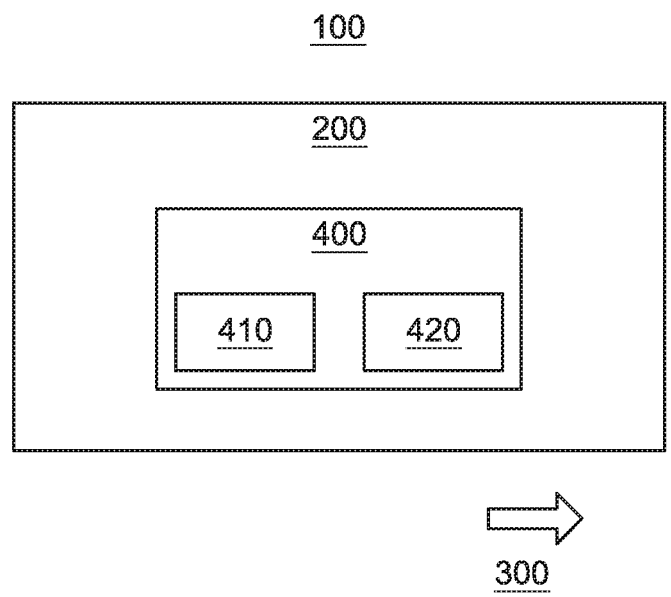
FIG. 1 is a top-level diagram illustrating an embodiment of a system for determining a movement of a mobile platform.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

The present disclosure sets forth method, apparatus, and system for determining a movement of a mobile platform, overcoming disadvantages of prior systems and methods.

The disclosed method apparatus and system can accurately and efficiently calculate error of measuring a movement (and/or motion) of a mobile platform by one type of sensor. The accurately-calculated error can be fed into a sensor fusion process that combines measurement by multiple types of sensors, in order to determine the movement accurately. Thus, the disclosure set forth herein provides solutions to the technical problems of efficiently and accurately measuring a movement of a mobile platform, and further contributes advancement of mobile platform technology as well as autonomous control technology.

Since currently-available techniques for determining a movement of a mobile platform are incapable of providing accurate and fast measurement of the movement of the mobile platform, a method, apparatus, and system for determining a movement of a mobile platform that increases measurement accuracy and speed can prove desirable and provide a basis for a wide range of mobile platform applications. Exemplary applications can include, but are not limited to, aerial photography, agricultural substance delivering, ocean oil spill removal, and fire extinguishing. This result can be achieved, according to one embodiment disclosed herein, by a system 100 as illustrated in FIG. 1.

Turning to FIG. 1, the system 100 can include a mobile platform 200. The mobile platform 200 may refer to any apparatus that is capable of movement. Exemplary mobile platforms can include, but are not limited to, automobiles, buses, trains, aircrafts, ships, and other types of motor vehicles. For illustrative purposes, the mobile platform can include a passenger vehicle and/or an unmanned aerial vehicle (UAV), and an operation of the mobile platform may include flight. However, wherever a UAV is described herein, the UAV may be replaced by another conventional type of mobile platform, and a flight may be replaced by another operation associated with a mobile platform without deviating from the concept covered in the scope of the present disclosure.

As shown in FIG. 1, the mobile platform 200 can perform a movement 300. The movement 300 can include a translational movement and/or a rotational movement of the mobile platform 200. The translational movement can comprise translational movement along any of one or more axes. In the translational movement, the mobile platform 200 can retain the same orientation relative to an axis. The rotational movement can comprise rotational movement about any of the one or more axes. For example, when including the translational movement, the movement 300 can include moving toward the sky or the ground, to the east or the west, to the south or the north, or a combination thereof.

A measurement of the movement 300 can include a measurement of a parameter that at least partially characterizes the movement 300. For example, the measurement of the movement 300 can include a measurement of a distance that the mobile platform 200 moves within (and/or during) a time interval, a speed and/or an acceleration of the mobile platform 200 at a predetermined time, an average speed and/or an average acceleration of the mobile platform 200 during a time interval, or a combination thereof. The parameter characterizing the movement 300 can include a vector. The measurement of the distance, speed, and/or acceleration can respectively include the measurement of magnitude and/or direction of the distance, speed and/or acceleration.

Although described as measuring a translational movement in some embodiments for purposes of illustration only, the disclosed methods, apparatuses and systems can be used for measuring any conventional type of movement, including rotational movement, without limitation.

The mobile platform 200 is shown as including a processor 400. The processor 400 can include processing hardware for performing data acquisition, data processing, and any other functions and operations described herein for controlling an operation of the mobile platform 200. Without limitation, the processor 400 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. In various embodiments, the processor 400 can include one processor for performing a portion of, or all of, the disclosed functions of the processor 400. Although described as including a single processor for purposes of illustration only, the processor 400 can include any suitable number of uniform and/or different processors, each of which can perform one or more uniform and/or different functions, respectively.

The processor 400 can be configured to obtain an error contribution value 410 for a first measurement of the movement 300 of the mobile platform 200. The first measurement can refer to a measurement of the movement 300 using, for example, sensors 500, 600 (shown in FIG. 2) coupled to the mobile platform 200. The first measurement can generate sensing data obtained by the sensors 500, 600, calculations for processing the sensing data, and/or results produced by the calculation.

The error contribution value 410 can include a parameter that can be generated in the first measurement. The value of the parameter can be related to accuracy and/or inaccuracy of the first measurement. The processor 400 can be configured to obtain the error contribution value 410 from the first measurement.

Further, the processor 400 can be configured to estimate an error 420 of the first measurement based upon the error contribution value 410. The error 420 can include one or more numerical values and/or a data array.

An exemplary error 420 can include a covariance matrix (and/or dispersion matrix and/or variance-covariance matrix). The covariance matrix can comprise a matrix whose element in the i,j position is the covariance between the $i^{th}$ and $j^{th}$ elements of a random vector. A covariance can be an indicator of how much two random variables change together. For example, when the first measurement of the movement 300 measures a displacement of the mobile platform 200 in a preset coordinate system, the displacement T can include a three-dimensional vector expressed as a 3×1 vector:

$$T = \begin{pmatrix} Tx \\ Ty \\ Tz \end{pmatrix} \quad \text{Equation (1)}$$

where Tx, Ty, and Tz are displacement components of the displacement T of the mobile platform 200 on x-axis, y-axis, and z-axis of a preset coordinate system, respectively. The preset coordinate system can include an absolute and/or relative coordinate system. An exemplary coordinate system can include a coordinate system defined with reference to a sensor that performs the first measurement.

The speed V can include a three-dimensional vector expressed as a 3×1 vector:

$$V = \begin{pmatrix} Vx \\ Vy \\ Vz \end{pmatrix} \quad \text{Equation (2)}$$

where Vx, Vy and Vz are speed components of the speed V of the mobile platform 200 on x-axis, y-axis, and z-axis of the preset coordinate system, respectively.

The error 420 of the displacement T obtained by the first measurement can include a covariance matrix $\Sigma_{cam}$:

$$\Sigma_{cam} = \begin{pmatrix} \text{Var}(Vx) & \text{Var}(Vx, Vy) & \text{Var}(Vx, Vz) \\ \text{Var}(Vy, Vx) & \text{Var}(Vy) & \text{Var}(Vy, Vz) \\ \text{Var}(Vz, Vx) & \text{Var}(Vz, Vy) & \text{Var}(Vz) \end{pmatrix} \quad \text{Equation (3)}$$

where diagonal elements Var(Vx), Var(Vy), and Var(Vz) are variances of the respective speed components Vx, Vy and Vz of the speed V. An off-diagonal element in the i,j position can be the covariance between the $i^{th}$ and $j^{th}$ elements of the speed V. For example, an element in the (1, 2) position, i.e., Var(Vx, Vy), can be the covariance between the first and second elements, such as the speed component Vx and the speed component Vy, of the speed V.

The error contribution value 410 can be related to the error 420 via a correlation. The processor 400 can be configured to use the correlation to calculate the error 420 based upon the error contribution value 410. When the error 420 includes the covariance matrix $\Sigma_{cam}$, the error contribution value 410 can have a correlation with one or more of the elements of the covariance matrix $\Sigma_{cam}$. In certain embodiments, the error contribution value 410 can have a correlation with variances Var(Vx), Var(Vy), and Var(Vz), respectively.

An exemplary correlation can include a functional relationship in which the error 420 is a function of the error contribution value 410. The functional relationship can be expressed using one or more equations. In one embodiment, variances Var(Vx), Var(Vy), and/or Var(Vz) can be a function of the error contribution value 410, respectively, and at least one of the respective functions can be in a form of one mathematical formula. Exemplary functional relationships can include linear, logarithmic, polynomial, power, exponential functions, or a combination thereof.

Figure 2:
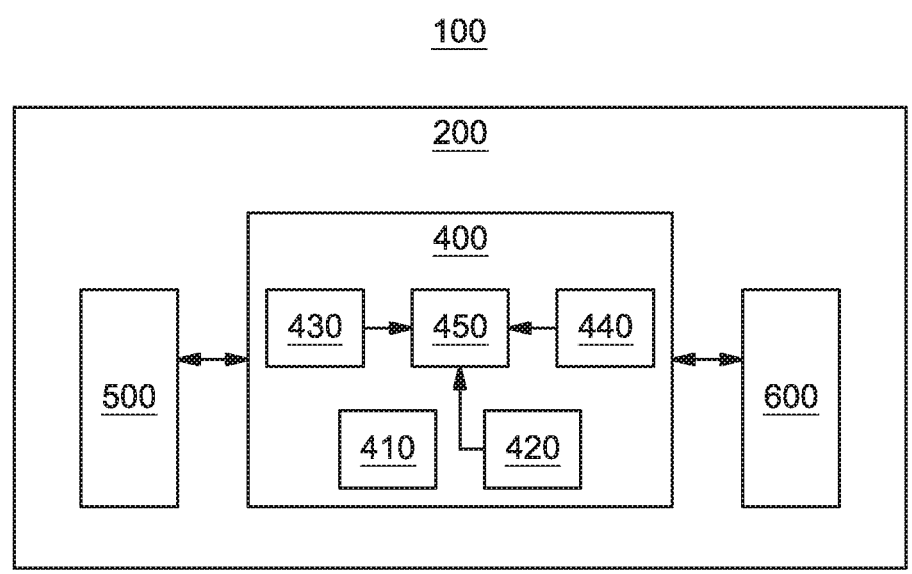
FIG. 2 is an exemplary diagram illustrating an alternative embodiment of the system of FIG. 1, wherein the system includes a first sensor and a second sensor for measuring the movement of the mobile platform.

FIG. 2 is an exemplary diagram illustrating an alternative embodiment of the system 100 of FIG. 1. As shown in FIG. 2, the system 100 can include a first sensor 500 and a second sensor 600 for measuring the movement 300 of the mobile platform 200.

The first sensor 500 and/or the second sensor 600 can be coupled with the processor 400. The first sensor 500 and/or the second sensor 600 can collect data characterizing the mobile platform 200. The exemplary data can include travel speed, acceleration and/or orientation of the mobile platform 200. Exemplary sensors 500, 600 can include a location data unit, an odometer, an inertial measurement unit (IMU), an accelerometer, a vision sensor and the like. The first sensor 500 and/or the second sensor 600 can send the collected data to the processor 400. The processor 400 can control the first sensor 500 and/or the second sensor 600 respectively, to instruct the first sensor 500 and/or the second sensor 600 to collect required data at a time specified by the processor 400.

For example, the processor 400 can instruct the first sensor 500 and/or the second sensor 600 to collect data when the mobile platform 200 enters a selected operating mode.

Exemplary operating modes can include modes of hovering, taking off, landing, changing speed, changing direction, ascending, and/or descending. Further, the processor 400 may instruct the first sensor 500 and/or the second sensor 600 to collect data when the mobile platform 200 arrives at pre-selected location and/or assumes a predetermined position.

The processor 400 can control the mobile platform 200 based on the data collected from the first sensor 500 and/or the second sensor 600. Additionally and/or alternatively, the processor 400 can process the collected data and send results of the processing to a controller (not shown) for controlling the mobile platform 200. The controller can be proximal to and/or distal from the mobile platform 200.

Although described as including the first sensor 500 and/or the second sensor 600 for purposes of illustration only, the mobile platform 200 can include any suitable number of uniform and/or different sensors. Although described as being separate from the first sensor 500 and/or the second sensor 600 for purposes of illustration only, the processor 400 can be at least partially integrated with the first sensor 500 and/or the second sensor 600. Although not shown in FIG. 2, the controller of the mobile platform 200 can be separate from, or at least partially integrated with, the processor 400.

The first sensor 500 can be of a type that is the same as, or different from, a type of the second sensor 600. In other words, a sensing technique of the first sensor 500 can be the same as, or different from, a sensing technique of the second sensor 600. In one embodiment, the first sensor 500 can include a vision sensor, and the second sensor 600 can include a sensor other than a vision sensor.

An exemplary vision sensor can include a camera for capturing still and/or video images, for example, of an object 150 (shown in FIG. 2). The processor 400 and/or the first sensor 500 can analyze the captured images to provide data of relative movement of the mobile platform 200 and the object 150.

In one embodiment, the second sensor 600 can include an IMU. The IMU can include an electronic device for measuring and reporting a velocity, speed and/or orientation of the mobile platform 200 and/or any forces, such as gravitational forces, acting on the mobile platform 200 by using a combination of one or more accelerometers, gyroscopes and/or magnetometers. In some embodiments, the IMU can include microscopic structures manufactured using MicroElectroMechanical Systems (MEMS) technology integrated on a fingernail-sized chip.

The first sensor 500 can collect and/or generate a first measurement of the movement 300 of the mobile platform 200. Any data pertaining to the movement 300 that are obtained using the first sensor 500 can be referred to as first measurement data 430.

The second sensor 600 can collect and/or generate a second measurement of the movement 300 of the mobile platform 200. Any data pertaining to the movement 300 that are obtained using the second sensor 600 can be referred to as second measurement data 440.

The first measurement data collected by the first sensor 500 can be combined with the second measurement data collected by the second sensor 600 to form composite sensing results. In general, sensing results can be generated by combining sensor data obtained by multiple sensors, also known as "sensor fusion." For instance, sensor fusion can be used to combine sensing data obtained by different sensor types, including as GPS sensors, inertial sensors, vision sensors, lidar, ultrasonic sensors, and so on. As another example, sensor fusion can be used to combine different types of sensing data, such as absolute measurement data (e.g., data provided relative to a global coordinate system such as GPS data) and relative measurement data (e.g., data provided relative to a local coordinate system such as vision sensing data, lidar data, or ultrasonic sensing data). Sensor fusion can be used to compensate for limitations or inaccuracies associated with individual sensor types, thereby improving the accuracy and reliability of the final sensing result.

The processor 400 can be configured to combine results obtained using the first sensor 500 with results obtained using the second sensor 600 to determine the movement 300. In other words, the processor 400 can combine the first measurement and the second measurement to determine the movement 300. Combining the first measurement and the second measurement can include combining the first measurement data 430 and the second measurement data 440 to generate a calculation result 450 of the movement 300 (as shown in FIG. 2).

Sensor fusion may include estimating an error of at least one type of sensing data to be estimated. For example, when a sensor fusion uses a method involving a Kalman filter, the method can calculate a Kalman gain for a type of sensing data. The Kalman gain can indicate the extent to which the corresponding type of sensing data can influence the result of sensor fusion. A greater Kalman gain can mean that the corresponding type of sensing data can less influence the result of sensor fusion. The calculation of Kalman gain requires an estimated error of the corresponding type of sensing data.

Accordingly, in various embodiments, the processor 400 may need to estimate the error 420 of the first measurement and feed the error 420 into the process for sensor fusion. As a result, the processor 400 can determine the movement 300 of the mobile platform 200 by combining the first measurement data 430 with the second measurement data 440 based on the estimated error 420. The error 420 can be estimated using a method 3000 as illustrated in FIG. 3.

Figure 3:
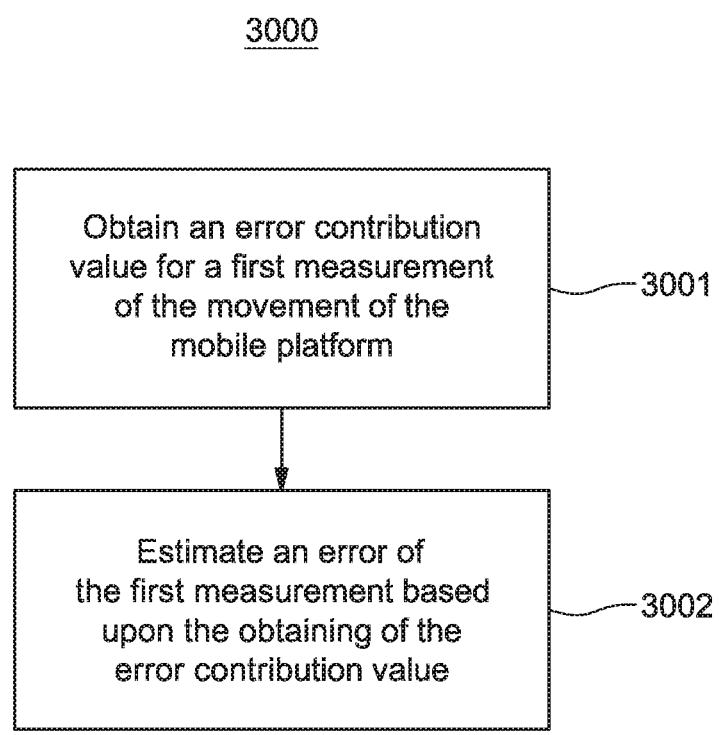
FIG. 3 is an exemplary top level flow chart illustrating an embodiment of a method for determining a movement of the mobile platform of FIG. 1.

FIG. 3 is an exemplary top level flow chart illustrating an embodiment of a method for determining the movement 300 of the mobile platform 200 (collectively shown in FIG. 1). The error contribution value 410 (shown in FIG. 2) for the first measurement of the movement 300 of the mobile platform can be obtained, at 3001. The error 420 (shown in FIG. 2) of the first measurement can be estimated, at 3002, based upon the obtaining the error contribution value 410.

The error 420, for example, can be estimated according to the correlation between the error 420 and the error contribution value 410. In an exemplary correlation, the error 420 can be a function of the error contribution value 410, the function being represented as a mathematical formula. The error contribution value 410 and the error 420 can be an input and an output, respectively, of the function.

Figure 4:
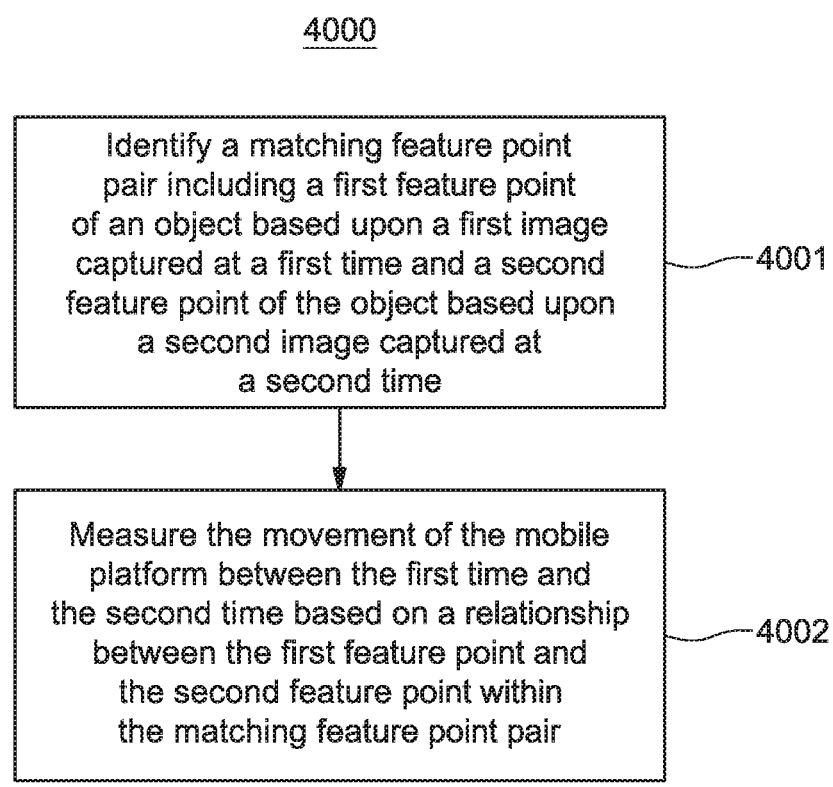
FIG. 4 is an exemplary flow chart illustrating an alternative embodiment of the method of FIG. 3, wherein the movement is measured via a vision sensor.

Exemplary embodiments are now provided to further illustrate the error contribution value 410, the error 420 and the correlation therebetween. FIG. 4 is an exemplary flow chart illustrating an alternative embodiment of the method of FIG. 3, wherein the movement 300 is measured via a vision sensor. The method 4000 of FIG. 4 can be used for determining the movement 300 of the mobile platform 200 (collectively shown in FIG. 1). Here, the movement 300 can be determined based at least in part on the first sensor 500 (shown in FIG. 2) being a vision sensor. The method 4000 illustrates one exemplary manner by which the first measurement for measuring the movement 300 can be collected and/or generated via the first sensor 500.

In FIG. 4, a matching feature point pair can be identified, at 4001. The matching feature point pair can include a first feature point of an object 150 (shown in FIG. 2) based upon a first image of the object 150 captured at a first time t1 and a second feature point of the object 150 based upon a second image of the object 150 captured at a second time t2.

The first image captured at the first time t1 can include the object 150 therein. The first feature point can include one pixel or multiple adjacent pixels within the first image. At least a portion of the object 150 can be captured in the first feature point. The processor 400 can use any conventional method to identify the first feature point within the first image.

The second image captured at the second time t2 can include the object 150 therein. The second feature point can include one pixel or multiple adjacent pixels within the second image. The processor 400 can use any conventional method to identify the second feature point within the second image. The second feature point can be associated with the first feature point to form the matching feature point pair. In other words, when the second feature point matches the first feature point, the first feature point and the second feature point capture the same content at first time t1 and the second time t2, respectively.

The object 150 can include any object of interest in the field of view of the vision sensor. The object 150 and/or the matching feature point pair can be identified based on machine vision and/or artificial intelligence methods, and the like. Suitable methods include feature detection, extraction and/or matching techniques such as Kanade-Lucas-Tomasi (KLT) feature tracker, Harris affine region detector, Features from accelerated segment test (FAST), Binary Robust Independent Elementary Features (BRIEF), RANSAC (RANdom SAmple Consensus), Shi & Tomasi corner detection, SURF blob (Speeded Up Robust Features) detection, MSER blob (Maximally Stable Extremal Regions) detection, SURF (Speeded Up Robust Features) descriptors, SIFT (Scale-Invariant Feature Transform) descriptors, FREAK (Fast REtinA Keypoint) descriptors, BRISK (Binary Robust Invariant Scalable Keypoints) descriptors, HOG (Histogram of Oriented Gradients) descriptors, and the like. Similarly, these methods can be used to identify one or more feature points within the image of the object 150 of interest.

In certain embodiments, the first time t1 can be different from the second time t2. For example, the second time t2 can be later than first time t1. Thus, the second image can be captured after the first image is captured. For example, each of the second image and the first image can be an image frame of a video image, and a time interval (t2−t1) can represent time that elapses between the capture of the second image and the capture of the first image.

A difference between a position of the first feature point in the first image and a position of the second feature point in the second image can be related to a movement of the vision sensor with reference to the object 150. When the object 150 includes a stationary item such a building, a tree and/or the like, the difference between a position of the first feature point in the first image and a position of the second feature point in the second image can be related to the movement of the vision sensor. As shown in FIG. 2, the first sensor 500 can be located on the mobile platform 200. Thus, the difference between the position of the first feature point in the first image and the position of the second feature point in the second image can be related to the movement 300 of the mobile platform 200.

The position of the first feature point can be described as a coordinate of the first feature point in the preset coordinate system. The position of the second feature point can be described as a coordinate of the second feature point in the preset coordinate system. The coordinate of the first feature point and/or the coordinate of the second feature point can include a coordinate of any dimension. An exemplary coordinate can include a three-dimensional coordinate, a two-dimensional coordinate, or a combination thereof.

In one embodiment, the coordinate P1 of the first feature point can include a three-dimensional coordinate:

$$P1 = \begin{pmatrix} x1 \\ y1 \\ z1 \end{pmatrix} \quad \text{Equation (4)}$$

where x1, y1 and z1 are the coordinate value of the first feature point on x-axis, y-axis, and z-axis of the preset coordinate system, respectively.

The coordinate P2 of the second feature point can include a three-dimensional coordinate:

$$P2 = \begin{pmatrix} x2 \\ y2 \\ z2 \end{pmatrix} = \begin{pmatrix} x2 \\ y2 \\ 1 \end{pmatrix} = \frac{1}{f}\begin{pmatrix} x2' \\ y2' \\ f \end{pmatrix} \quad \text{Equation (5)}$$

where x2, y2 and z2 are the coordinate value of the second feature point on x-axis, y-axis, and z-axis of the preset coordinate system, respectively. x2', y2' are the coordinate value of the second feature point, respectively, on a focal plane of the vision sensor, and can be obtained from the position of the second feature point in the second image. f is the focal length of the vision sensor.

In one example, the z-axis coordinate z2 of Equation (5) can be a preset constant. The z-axis coordinate z2 can be a preset constant for a specific projection plane of the second image. For example, the present constant of z2 can be set to be one. In that case, the coordinate of the second feature point can be effectively two-dimensional and represent a projection of the second feature point on a plane in the preset coordinate system. The measurement of the movement 300 can use a three-dimensional coordinate and/or a two-dimensional coordinate of the second feature point, without limitation.

As shown in FIG. 4, the movement 300 of the mobile platform 200 between the first time t1 and the second time t2 can be measured, at 4002, based on a relationship between the first feature point and the second feature point within the matching feature point pair.

The relationship between the first feature point and the second feature point can include a relationship between the coordinate P1 of the first feature point and the coordinate P2 of the second feature point. An exemplary relationship can include:

$$P2 = \lambda K(RP1+T) \quad \text{Equation (6)}$$

where λ is a scaling parameter, K is an internal reference matrix, and the rotation matrix R is a rotation matrix that characterizes a rotational movement of the mobile platform 200.

In some embodiments, λ can be a preset numerical value for a specific projection plane of the second image. In other embodiments, λ can be an unknown variable and can be solved together with the displacement T by using Equation (6).

The internal reference matrix K can be specific to the vision sensor. For example, the vision sensor can include an imaging device such as a camera. The internal reference matrix K can describe a mapping of the camera from three-dimensional points of a target object to two dimensional points in an image. The camera can have a specific internal reference matrix K. The internal reference matrix K can comprise a matrix of any suitable dimension and, in one embodiment, can comprise a 3×3 matrix.

Alternatively and/or additionally, the mobile platform 200 can include a sensor for detecting rotational movement of the mobile platform 200. For example, such a sensor can include an IMU. The IMU can measure the movement 300 and provide the rotation matrix R to the processor 400. The rotation matrix R can comprise a matrix of any suitable dimension and, in some embodiments, can comprise a 3×3 matrix.

Equation (6) can provide three equations to solve the three unknown displacement components Tx, Ty and Tz of the displacement T as shown in Equation (1). When λ is unknown and needs to be solved, Equation (6) can provide three equations containing more than three unknown displacement components Tx, Ty, and Tz, as well as λ. In that case, two or more matching feature point pairs can be obtained as described, at 4001, in FIG. 4. Each matching feature point pair can provide three additional equations derived from Equation (6). Accordingly, a suitable fitting technique can be used to solve the Equation (6) to provide the displacement components Tx, Ty, and Tz of the displacement T. For example, a least-squares method can be used for solving the Equation (6) and obtain the displacement T.

The speed V of the mobile platform 200 can be calculated using Equation (7).

$$V = T/(t2-t1) \qquad \text{Equation (7)}$$

The speed V calculated using Equation (7) can include the average speed between the first time t1 and the second time t2.

The first measurement using the vision sensor is not necessarily accurate and can be subject to an error. In general, sources of errors can include, but are not limited to, radial and tangential lens distortions of imaging device of the vision sensor, variances in pixel values during extraction of a feature point in an image, errors in mounting the vision sensor, changes in illumination for capturing the images, inaccurate matching of the first feature point with the second feature point. In addition, when the vision sensor includes multiple imaging devices for simultaneously capturing the object in respective images, a coordinate of a feature point can be generated by combining pixel values of the feature point in the multiple respective images, such as using triangulation and/or the like. In that case, the feature point may be extracted from the multiple imaging devices with inaccuracy.

For example, in the method 4000 as shown in FIG. 4, the error of the first measurement can include an error in extracting pixel points and matching the first feature point with the second feature point. The error in extracting pixel points and matching the first feature point with the second feature point can lead to an error of respective coordinates of the first feature point and the second feature point. Further, respective values of the internal reference matrix K and the rotation matrix R (as shown in Equation (6)) can also introduce an error of the first measurement.

Figure 5:
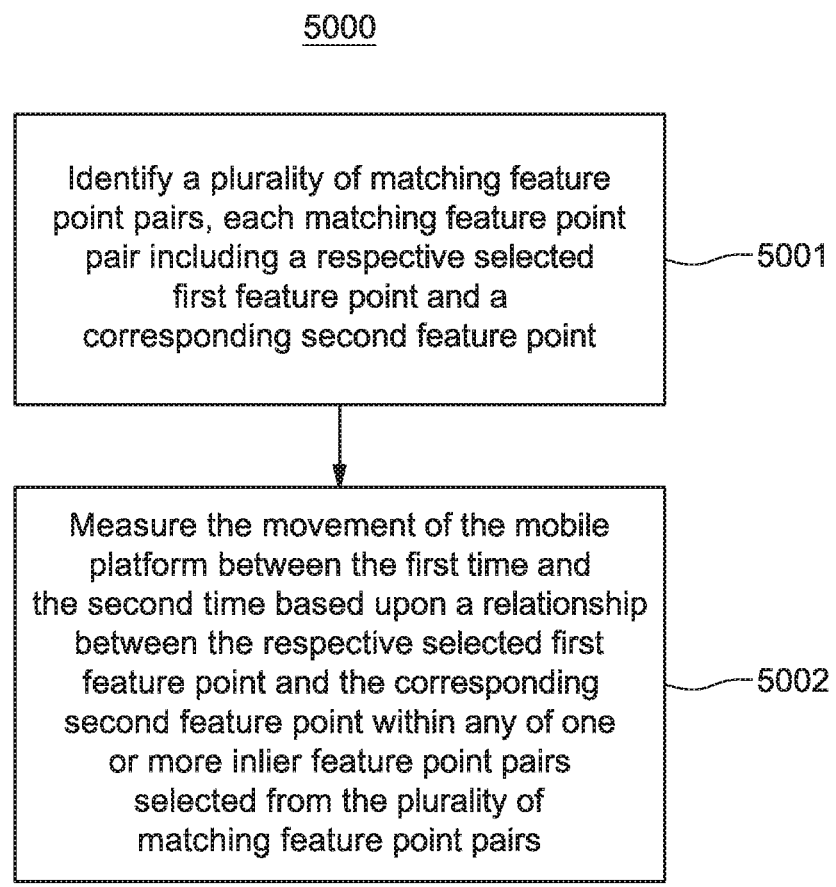
FIG. 5 is an exemplary flow chart illustrating another alternative embodiment of the method of FIG. 3, wherein the method includes identifying a plurality of matching feature point pairs.

When the first measurement uses multiple matching feature point pairs, the processor 400 can be more likely to identify one or more matching feature point pairs that provide a correct measurement result of the movement 300 and can thus measure the movement 300 with a greater accuracy. FIG. 5 is an exemplary flow chart illustrating another alternative embodiment of the method of FIG. 3. The method 5000 of FIG. 5 can be used for determining the movement 300 of the mobile platform 200 (collectively shown in FIG. 1). The method 5000 can include identifying a plurality of one matching feature point pairs. Here, the movement 300 can be determined based at least in part on the first sensor 500 (shown in FIG. 2) being a vision sensor.

In FIG. 5, a plurality of matching feature point pairs is identified, at 5001. Each matching feature point pair can include a respective selected first feature point and a corresponding second feature point. Within each matching feature point pair, the first feature point can be selected from the first image of the object 150 (shown in FIG. 2) captured at the first time t1, and the corresponding second feature point can be selected from the second image of the object 150 captured at the second time t2.

Although described as including an object for purposes of illustration only, the first image and/or the second image can include any suitable number of uniform and/or different objects, each of which can be used for identifying some or all of the matching feature point pairs during the first measurement. In other words, the first feature points are not necessarily selected from the same object in the first image and, accordingly, the corresponding second feature points are not necessarily selected from the same object in the second image.

In FIG. 5, the movement 300 of the mobile platform 200 between the first time t1 and the second time t2 can be measured, at 5002, based upon a relationship between the respective selected first feature point and the corresponding second feature point within any of one or more inlier feature point pairs selected from the plurality of matching feature point pairs.

Generally, an inlier includes data whose distribution can be explained by some set of model parameters, though may be subject to noise, and an outlier includes data that do not fit the model. Thus, an inlier feature point pair can be a matching feature point pair that can produce a calculated result of the movement 300 that is assumed to be accurate. An outlier feature point pair can be a matching feature point pair that can produce a calculated result of the movement 300 that is assumed to be inaccurate. Further, the most correct result among the plurality of matching feature point pairs can be combined with the second measurement data 440 to generate the calculation result 450 of the movement 300.

Figure 6:
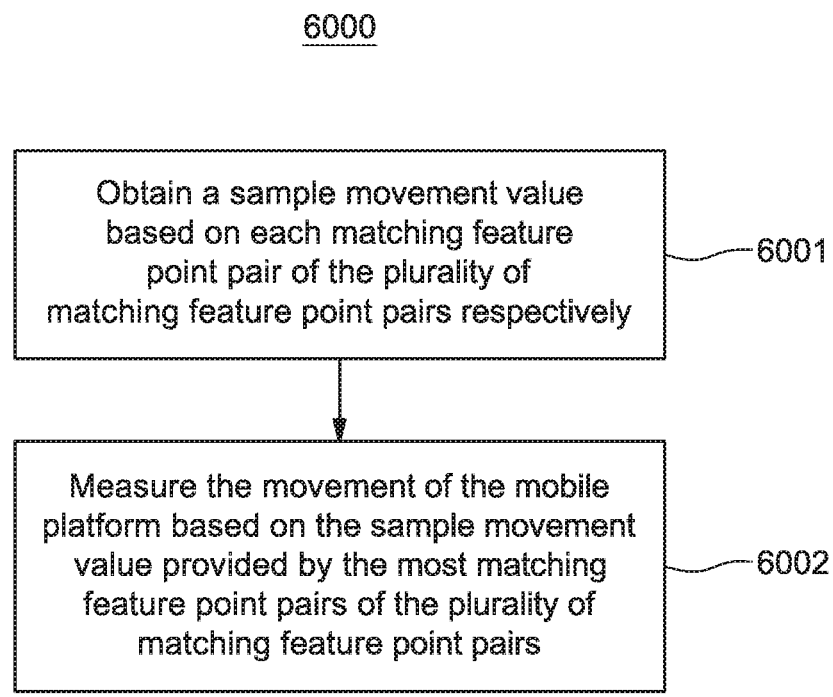
FIG. 6 is an exemplary flow chart illustrating an alternative embodiment of the method of FIG. 5, wherein the method includes identifying one or more inlier feature point pairs.

The inlier feature point pair(s) can include a subset of the plurality of matching feature point pairs. In some embodiments, each matching feature point pair can provide a sample movement value. A sample movement value can include a sample value for characterizing the movement. An exemplary sample movement value can include a sample displacement T value. The sample displacement T value can be a value of the displacement T measured by a matching feature point pair. For example, by using Equation (6), each matching feature point pair can provide a sample displacement T value, respectively. Thus, a plurality of sample displacement T values can be generated. However, some sample displacement T values may be accurate; whereas, other sample displacement T values may be inaccurate. The processor 400 can be configured to determine which sample displacement T value is accurate based on a suitable method and/or selection criterion. An exemplary method for determining which sample displacement T value is accurate is shown in FIG. 6. After the processor 400 determines which sample displacement T value is accurate, the processor 400 can thus identify each matching feature point pair that provides the accurate sample displacement T value as an inlier feature point pair.

The method and/or selection criterion that the processor 400 uses for determining which sample displacement T value is accurate, and accordingly determining which matching feature point pair is an inlier feature point pair, are not limited in the present disclosure. For illustrative purposes, FIG. 6 is an exemplary flow chart illustrating an alternative embodiment of the method of FIG. 5, wherein the method includes identifying one or more inlier feature point pairs, wherein the method includes identifying one or more inlier feature point pairs.

In FIG. 6, a sample movement value can be obtained, at 6001, based on each matching feature point pair of the plurality of matching feature point pairs, respectively. As previously mentioned, each matching feature point pair can provide a sample displacement T value. The movement 300 of the mobile platform 200 can be measured, at 6002, based on the sample movement value provided by the most matching feature point pairs of the plurality of matching feature point pairs. The most matching feature point pairs are thus the one or more inlier feature point pairs.

To implement the exemplary method 6000, the processor 400 (shown in FIG. 1) can be configured to count the number of matching feature point pairs that generate the same sample displacement T value. Thus, each sample displacement T value can correspond to a number of matching feature point pairs, respectively. The sample displacement T value generated by the greatest number of matching feature point pairs, i.e., the sample displacement T value provided by the most matching feature point pairs, can be selected by the processor 400 as the accurate value of the movement 300. The number of matching feature point pairs corresponding to such a sample displacement T value can thus be a number 'n' of inlier feature point pairs.

The selection criterion that the processor 400 uses for determining which sample displacement T value is correct is not limited to method 6000. In one example, an average value of the sample displacement T values can be selected as the correct displacement T value, and the number of matching feature point pairs corresponding to such a sample displacement T value can thus be the number n of inlier feature point pairs. In another example, a median value of the sample displacement T values can be selected as the correct displacement T value, and the number of matching feature point pairs corresponding to such a sample displacement T value can thus be the number n of inlier feature point pairs.

Generally, a greater number n of inlier feature point pairs can indicate that currently-measured feature point(s) are obvious and/or stable. Thus, the measured displacement T value of the movement 300 can have greater accuracy and less error. The error contribution value 410 (shown in FIGS. 1-2) can include the number n of inlier feature point pairs. The processor 400 can be configured to estimate the error 420 using a correlation between the error contribution value 410 and the error 420. When the error 420 includes the covariance matrix $\Sigma_{cam}$, the error contribution value 410 can have a correlation with Var(Vx), Var(Vy), and Var(Vz), respectively.

An exemplary correlation can include a functional correlation in which the error 420 increases with the number n. For example, in the functional correlation, each of Var(Vx), Var(Vy), and Var(Vz) can be given as follows:

$$\mathrm{Var}(\mathit{Vx}) = g1(n), \quad\quad\quad \text{Equation (8)}$$

$$\mathrm{Var}(\mathit{Vy}) = g2(n), \quad\quad\quad \text{Equation (9)}$$

$$\mathrm{Var}(\mathit{Vz}) = g3(n) \quad\quad\quad \text{Equation (10)}$$

where g1(n), g2(n) and g3(n) each is a function of the number n, respectively. Exemplary values of g1(n), g2(n) and g3(n) can increase as the number n decreases. Mathematical forms of g1(n), g2(n) and g3(n) can include, but not limited to linear, logarithmic, polynomial, power, exponential functions, or a combination thereof.

For example, each of Var(Vx), Var(Vy), and Var(Vz) of the error 420 can increase linearly with a reciprocal of an exponential of the number n, given as follows:

$$\mathrm{Var}(\mathit{Vx}) = k1/n^a + b1, \quad\quad\quad \text{Equation (11)}$$

$$\mathrm{Var}(\mathit{Vy}) = k2/n^a + b2, \quad\quad\quad \text{Equation(12)}$$

$$\mathrm{Var}(\mathit{Vz}) = k3/n^a + b3 \quad\quad\quad \text{Equation(13)}$$

where each of parameters a, k1, b1, k2, b2, k3, and/or b3 can include a mathematical expression containing a constant numerical value, an error contribution value 410 other than the number n, or a combination thereof. Further, the parameters a, k1, b1, k2, b2, k3, and/or b3 can be different or uniform, without limitation.

In some embodiments, the parameter a can be equal to one. In that case, each of Var(Vx), Var(Vy), and Var(Vz) of the error 420 can increase linearly with a reciprocal of the number n. Further, k1, b1, k2, b2, k3, and/or b3 can be different or uniform constants. Exemplary methods for providing values of k1, b1, k2, b2, k3, and/or b3 are set forth in methods discussed herein with reference to FIGS. 8 and 12.

Additionally and/or alternatively, the error contribution value 410 can include parameter(s) other than the number n. For example, in general, an object far from the vision sensor may be measured with a greater error than a nearby object. Therefore, the error contribution value 410 can include an object distance Z between the object 150 and the first sensor 500. As the first sensor 500 can be located on the mobile platform 200 as shown in FIG. 2, the object distance Z between the object 150 and the first sensor 500 can be equal to a distance between the object 150 and the mobile platform 200. For example, in the functional correlation, each of Var(Vx), Var(Vy), and Var(Vz) of the error 420 can increase with Z. That is:

$$\mathrm{Var}(\mathit{Vx}) = g4(Z), \quad\quad\quad \text{Equation (14)}$$

$$\mathrm{Var}(\mathit{Vy}) = g5(Z), \quad\quad\quad \text{Equation (15)}$$

$$\mathrm{Var}(\mathit{Vz}) = g6(Z) \quad\quad\quad \text{Equation (16)}$$

where g4(Z), g5(Z), and g6(Z) each is a function of the object distance Z, respectively. Exemplary values of g4(Z), g5(Z), and g6(Z) can increase as the object distance Z increases. Mathematical forms of g4(Z), g5(Z), and g6(Z) can include, but not limited to linear, logarithmic, polynomial, power, exponential functions, or a combination thereof.

However, the object distance Z does not necessarily need to be directly expressed in the functional relationship. A parameter that has a correlation with the object distance Z can substitute the object distance Z in the Equations (14)-(16).

Figure 7:
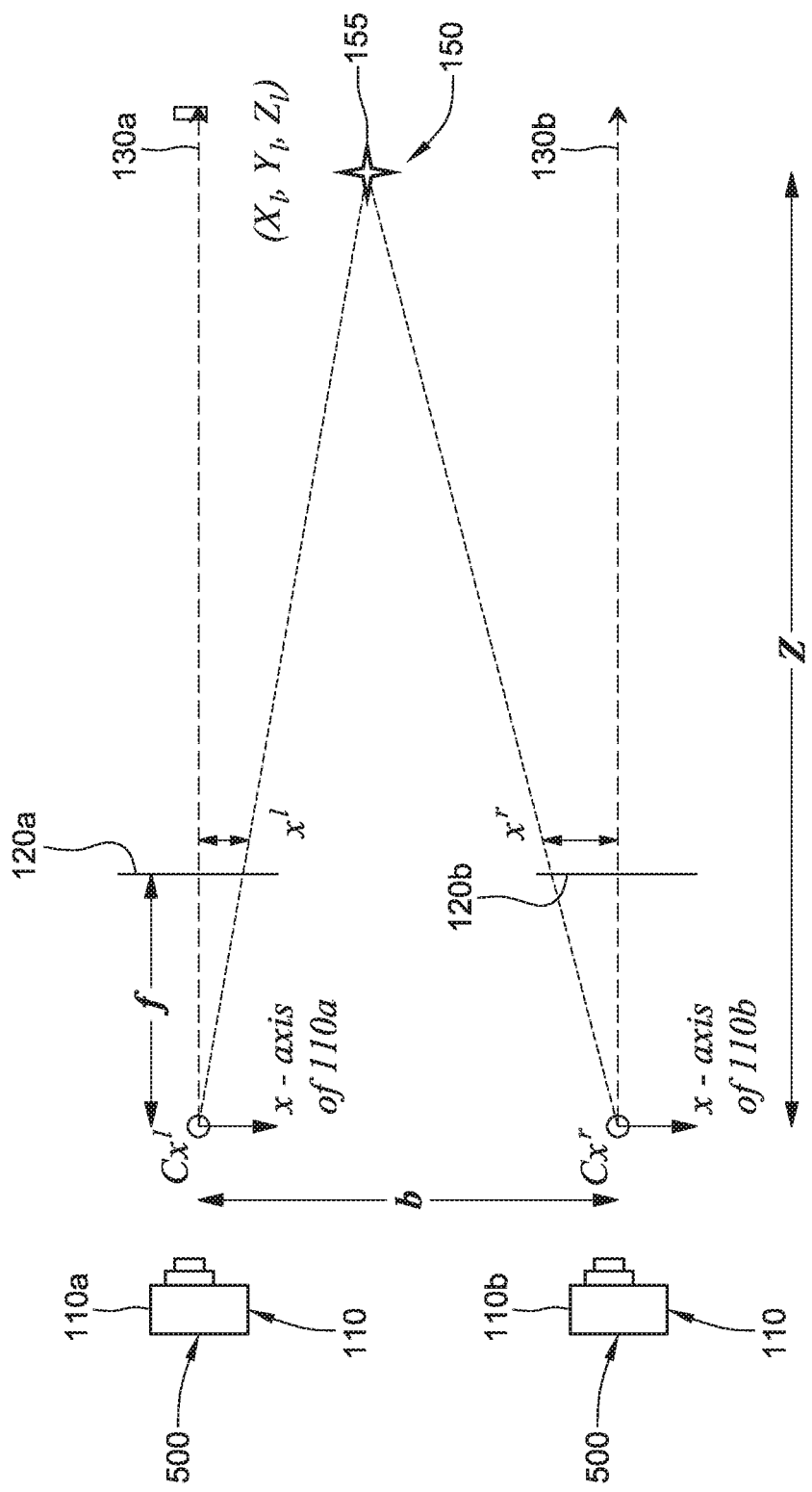
FIG. 7 is an exemplary diagram illustrating an embodiment of a system for obtaining a coordinate of a feature point by using a first sensor of the mobile platform of FIG. 2.

To illustrate parameters that can reflect the distance, an exemplary process for obtaining the coordinate of the first feature point (as discussed herein with reference to FIGS. 4-5) is described below. In the exemplary process, the coordinate of the first feature point can include a three-dimensional coordinate as shown in Equation (3). The vision sensor can include two imaging devices for capturing the object in respective images. Each imaging device can capture a two-dimensional image, respectively. The processor 400 can be configured to obtain the three-dimensional coordinate from the two two-dimensional images by calculating the object distance Z using triangulation. FIG. 7 is an exemplary diagram illustrating an embodiment of a system for obtaining a coordinate of a feature point by using the first sensor 500 of the mobile platform 200 of FIG. 3. The three-dimensional coordinate of the first feature point can be determined using a method of triangulation.

In FIG. 7, the first sensor 500 can include a vision sensor 110 that includes two imaging devices 110a, 110b. Each of the imaging devices 110a, 110b can perceive the same object 150 of interest but in different spatial coordinates. For example, the imaging devices 110a, 110b can have respective x-axes 130a, 130b as illustrated in FIG. 7. The imaging devices 110a, 110b can perceive the object 150 of interest along their respective optical axes 130a, 130b and thereby arrive at two different two-dimensional sub-images 120a, 120b of the object 150 of interest. The first image as described in FIGS. 4 and/or 5 can include the sub-images 120a, 120b. The two-dimensional sub-images 120a, 120b are typically different, being taken from different positions (or perspectives), unless the imaging devices 110a, 110b are positioned such that their optical axes 130a, 130b coincide. Accordingly, under most circumstances, a binocular disparity d (represented, for example, in Equation (20)) can be found between the sub-images 120a, 120b, as shown in Equation (20).

The method of triangulation can be used to ascertain the object distance Z using the binocular disparity d between the sub-images 120a, 120b. The two-dimensional sub-images 120a, 120b can be compared to obtain the binocular disparity d associated with a feature point 155 of the object 150 of interest. For illustrative purposes, the two imaging devices 110a, 110b can be referred to as a first imaging device 110a and a second imaging device 110b. The two-dimensional sub-images 120a, 120b can be referred to as a first sub-image 120a and a second sub-image 120b. The position of the feature point 155, represented by its three-dimensional coordinates $(X_l, Y_l, Z_l)$, in a preset coordinate system with reference to the first imaging device 110a, can be given as follows:

$$X_l = \frac{b}{d}(x^l - c_x^l),$$ Equation (17)

$$Y_l = \frac{b}{d}(y^l - c_y^l),$$ Equation (18)

$$Z_l = \frac{b}{d}f$$ Equation (19)

where $c_x^l$ and $c_y^l$ represent respective center coordinates of the first imaging device 110a, $x^l$ and $y^l$ represent the coordinates of the feature point 155 in the first sub-image 120a, b is the baseline (in other words, the distance between the center coordinates of the imaging devices 110a, 110b), f is the focal length of each imaging devices 110a, 110b, d is the binocular disparity between the sub-images 120a, 120b. For illustrative purposes, FIG. 7 shows the imaging devices as having the same focal length f. However, even if the imaging devices 110a, 110b have different focal lengths, the sub-images 120a, 120b can be scaled to a projection plane having a same distance from the imaging devices 110a, 110b, to implement the triangulation in FIG. 7. For example, the imaging devices 110a, 110b can have a respective focal length 2 f and f. In that case, the coordinates $x^l$ and $y^l$ of the first sub-image 120a can each be scaled by being multiplied with 0.5. The scaled coordinates $x^l$ and $y^l$ can thus belong to a projection plane having the distance f from the first imaging device 110a, and can thus be used for triangulation with the second sub-image 120b via Equations (17)-(20).

When $x^r$ and $y^r$ represent the coordinates of the feature point 155 in the first sub-image 120b, the binocular disparity d can be represented here as:

$$d = x^l - x^r.$$ Equation (20)

Based on the above principles, the three-dimensional coordinate of a feature point can be obtained using the first imaging device 110a and the second imaging device 110b based on stereopsis. The first and second sub-images 120a, 120b can be acquired either simultaneously or successively, as desired. The binocular disparity d can be obtained from the first and second sub-images 120a, 120b. In one embodiment, the first and second sub-images 120a, 120b can be advantageously acquired simultaneously at the first time t1 to reduce error attributable to shifts of the object 150 and/or the first sensor 500 over time.

In certain other embodiments, one imaging device can capture the first and second sub-images 120a, 120b. The imaging device, for example, can capture the first and second sub-images 120a, 120b at two different times. At the two different times, a position of the imaging device relative to the object 150 can be different. The binocular disparity d can be obtained from the first and second sub-images 120a, 120b, and be used as approximately the binocular disparity d at the first time t1.

In general, and as shown in Equation (19), a difference between the first sub-image 120a and the second sub-image 120b can be reduced as the object distance Z increases. Further, the object distance Z of the feature point 155 from the first sensor 500 can be inversely proportional to the binocular disparity d. The binocular disparity d can be obtained during the first measurement. Therefore, the error contribution value 410 can include the binocular disparity d. For example, in the functional correlation, each of Var(Vx), Var(Vy), and Var(Vz) can be given as follows:

$$\text{Var}(Vx) = g7(d)$$ Equation (21)

$$\text{Var}(Vy) = g8(d)$$ Equation (22)

$$\text{Var}(Vz) = g9(d)$$ Equation (23)

where g7(d), g8(d) and g9(d) each is a function of the binocular disparity d, respectively. Exemplary values of g7(d), g8(d) and g9(d) can increase as the binocular disparity d decreases. Mathematical forms of g7(d), g8(d) and g9(d) can include, but not limited to linear, logarithmic, polynomial, power, exponential functions, or a combination thereof.

For example, each of Var(Vx), Var(Vy), and Var(Vz) of the error 420 can increase linearly with a reciprocal of an exponential of the binocular disparity d, given as follows:

$$\text{Var}(V_x) = k4/d^c + b4 \quad \text{Equation (24)}$$

$$\text{Var}(V_y) = k5/d^c + b5 \quad \text{Equation (25)}$$

$$\text{Var}(V_z) = k6/d^c + b6 \quad \text{Equation (26)}$$

where each of parameters c, k4, b4, k5, b5, k6, and/or b6 can include a mathematical expression containing a constant numerical value, an error contribution value 410 other than the binocular disparity d, or a combination thereof. In one embodiment, c=2, therefore, each of Var(Vx), Var(Vy), and Var(Vz) of the error 420 can increase linearly with a reciprocal of a square of d. Further, k4, b4, k5, b5, k6, and/or b6 can be different or uniform constants. Exemplary methods for providing values of k4, b4, k5, b5, k6, and/or b6 are set forth in methods discussed herein with reference to FIGS. 8 and 12.

Each feature point can be associated with a respective binocular disparity d. The relevant binocular disparity d for calculating the error 420 can be identified using any suitable methods, without limitation. In one example, the binocular disparity d for calculating the error 420 can be an average of each binocular disparity d of the first feature points and/or the matching second feature points. In another example, the relevant binocular disparity d for calculating the error 420 can be an average of each binocular disparity d of the first feature points and/or the matching second feature points within some or all of the inlier feature point pairs. In yet another example, the binocular disparity d for calculating the error 420 can be an average of all the binocular disparities d of the first feature points. In another example, the binocular disparity d for calculating the error 420 can be an average of all the binocular disparities d of the first feature points within some or all of the inlier feature point pairs.

In certain embodiments, the error contribution value 410 can include the number n of inlier feature point pairs and binocular disparity d. For example, by combining Equations (11)-(13) and (24)-(26), the error 420 can be estimated to increase linearly with a reciprocal of the number n and to increase linearly with a reciprocal of a square of the binocular disparity d, as follows:

$$\text{Var}(V_x) = k7/nd^2 + b7 \quad \text{Equation (27)}$$

$$\text{Var}(V_y) = k8/nd^2 + b8 \quad \text{Equation (28)}$$

$$\text{Var}(V_z) = k9/nd^2 + b9 \quad \text{Equation (29)}$$

where k7, b7, k8, b8, k9, and/or b9 can include a mathematical expression containing a constant numerical value, an error contribution value 410 that is other than the number n and/or d, or a combination thereof. Further, k7, b7, k8, b8, k9, and/or b9 can be different or uniform, without limitation. In some embodiments, each of k7, b7, k8, b8, k9, and/or b9 can include a different and/or uniform numerical constant. Exemplary methods for providing values of k7, b7, k8, b8, k9, and/or b9 are set forth in methods discussed herein with reference to FIGS. 8 and 12.

When the error 420 includes the covariance matrix $\Sigma_{cam}$ as shown in Equation (3), the processor 400 can be configured to estimate the diagonal elements Var(Vx), Var(Vy), and Var(Vz) using mathematical formula of Equations (27)-(29). In some embodiments, the off-diagonal elements can set to be zero, present constant values(s) and/or a function of the error contribution values 410, without limitation.

Although Var(Vx), Var(Vy), and Var(Vz) are calculated in the disclosed methods for purposes of illustration only, any element of the error 420 such as off-diagonal elements of the covariance matrix $\Sigma_{cam}$ can have a correlation with the error contribution values 410 using the methods in accordance with the disclosed methods.

The method disclosed herein can estimate the error faster and more accurately. In a conventional method for estimating the error of measurement by a vision sensor, a covariance matrix $\Sigma_{pixel}$ of a feature point extraction error need to be hypothesized first. The feature point extraction error, assumed to have a normal distribution with an average value of zero, can be represented as follows:

$$\Sigma_{pixel} = \begin{pmatrix} \sigma_{x1}^2 & & & \\ & \sigma_{y1}^2 & & \\ & & \sigma_{x2}^2 & \\ & & & \sigma_{y2}^2 \end{pmatrix} \quad \text{Equation (30)}$$

where $\sigma_{x1}^2$, $\sigma_{y1}^2$, $\sigma_{x2}^2$, and $\sigma_{y2}^2$ can refer to the variance of the extraction error of the first feature point in an x direction, the first feature point in a y direction, the matching second feature point in the x direction, and the matching second feature point in the y direction. The $\Sigma_{pixel}$ is then applied to the linear algebraic calculation of the displacement T using Q matching feature point pairs.

The covariance matrix of the jth measurement of M measurements of the displacement T needs to use the matrix equation:

$$^j\Sigma_t = {^jA^+} \begin{pmatrix} {^jB_1}{^jR}{^jJ_1}\Sigma_{pixel}{^jJ_1^T}{^jR^T}{^jB_1^T} & & \\ & \ddots & \\ & & {^jB_N}{^jR}{^jJ_Q}\Sigma_{pixel}{^jJ_Q^T}{^jR^T}{^jB_Q^T} \end{pmatrix} {^jA^{+T}} \quad \text{Equation (31)}$$

The covariance matrix of the speed V can then be calculated by transforming the $\Sigma_t$ to IMU coordinate system and divided by a square of a time interval (t2−t1).

Equation (31) has significant complexity. For example, each of $A^+$, Bi, R, and J is a multi-dimensional matrix as described as following.

$$^jA^+ = ({^jA^T}{^jA})^{-1}{^jA^T} \quad \text{Equation (32)}$$

where j=1 to M, and:

$$^jA = \begin{pmatrix} {^jA_1} \\ \vdots \\ {^jA_Q} \end{pmatrix} \quad \text{Equation (33)}$$

where N indicates the total number of matching feature points of each measurement.

$$^jA_i = \begin{pmatrix} -f & {^ju_i^*} - u_0 \\ & -f & {^jv_i^*} - v_0 \end{pmatrix} \quad \text{Equation (34)}$$

where a central coordinate of the image is $(u_0, v_0)^T$, a focal distance of the camera is f, a baseline is b, and ui* and vi* are the two-dimensional projection coordinate of the second feature point at t2. The first feature point and the second feature point are $({}^j u_i, {}^j v_i)^T$ and $({}^j u_i', {}^j v_i')^T$, and i indicates the ith matching feature point pair of the N matching feature point pairs.

Further, $$ {}^j B_i = \begin{pmatrix} f & -({}^j u_i^* - u_0) \\ & f & -({}^j v_i^* - v_0) \end{pmatrix}. \qquad \text{Equation (35)} $$

R is the rotation matrix. J is a transformation matrix used for obtaining a Taylor expansion approximation of a covariance matrix of the three-dimensional coordinate of the first feature point. J can be given as following:

$$ {}^j J_i = \nabla g = \begin{pmatrix} \frac{b}{{}^j u_i - {}^j u_i'} - \frac{({}^j u_i - u_0)b}{({}^j u_i - {}^j u_i')^2} & 0 & \frac{({}^j u_i - u_0)b}{({}^j u_i - {}^j u_i')^2} & 0 \\ -\frac{({}^j v_i - v_0)b}{({}^j u_i - {}^j u_i')^2} & \frac{b}{{}^j u_i - {}^j u_i'} & \frac{({}^j v_i - v_0)b}{({}^j u_i - {}^j u_i')^2} & 0 \\ -\frac{fb}{({}^j u_i - {}^j u_i')^2} & 0 & \frac{fb}{({}^j u_i - {}^j u_i')^2} & 0 \end{pmatrix} \qquad \text{Equation (36)} $$

Therefore, as can be seen in Equations (30)-(36), to calculate ${}^j\Sigma_t$, a significant amount of matrix calculation are performed on an N×N matrix (such as Equation (31)). Each element of the N×N matrix may include an embedded matrix greater than a dimension of 2×2. Coordinate of each feature point is used, and an error distribution parameter such as $\sigma^2$ for feature point extraction is used. Such calculation is time-consuming.

Moreover, to calculate ${}^j\Sigma_t$, the variances $\sigma^2_{x1}$, $\sigma^2_{y1}$, $\sigma^2_{x2}$, and $\sigma^2_{y2}$ in Equation (30) need to be obtained in a predetermined manner. For example, in one or more test measurements, ${}^j\Sigma_t$ is obtained based on comparing a displacement respectively measured using the vision sensor and using a reference instrument such as a Vicon motion capture system manufactured by Vicon Motion Systems Ltd., UK. The variances $\sigma^2_{x1}$, $\sigma^2_{y1}$, $\sigma^2_{x2}$, and $\sigma^2_{y2}$ are back calculated based on the obtained ${}^j\Sigma_t$. $\Sigma_{pixel}$ in Equation (30) is thus solved. $\Sigma_{pixel}$ is then used for calculating ${}^j\Sigma_t$ in future measurements via Equations (30)-(36).

However, the variances $\sigma^2_{x1}$, $\sigma^2_{y1}$, $\sigma^2_{x2}$, and $\sigma^2_{y2}$ obtained in such a way is subject to influence of any random error of an outlier feature point pair, and thus may unnecessarily introduce noise that cause inaccuracy in estimating the error of the first measurement.

In contrast, by using the disclosed methods and apparatus, the error of the first measurement can be estimated according to the correlation between the error contribution values 410 and error 420. The correlation can be independent of an error distribution parameter of a coordinate of the first feature point and/or the second feature point, such as the variances $\sigma^2_{x1}$, $\sigma^2_{y1}$, $\sigma^2_{x2}$, and $\sigma^2_{y2}$ in Equation (30). Further, the correlation can be independent of a coordinate of the first feature point and/or the second feature point.

In some embodiments, an element of the covariance matrix $\Sigma_{cam}$ of the first measurement can be individually calculated using a simple formula. The formula can include one or more error contribution values 410. Each error contribution value 410 can be obtained from the first measurement. The coordinate of a feature point and parameters of the error distribution of coordinates of the feature points are not necessary for the calculation. The calculation can thus be significantly simplified.

The selection of error contribution value 410 can be based on an empirical and/or intuitive understanding of source of errors for the first measurement and can be directly related to physical and/or statistical nature of the measurement.

For example, in the methods 4000-6000 discussed above with reference to FIGS. 4-6, pixel extraction and/or matching can be a source of error. Such pixel errors can affect accuracy of the binocular disparity d. The error in binocular disparity d can cause the pixel error be transferred into error of speed measurement via the triangulation process. The selection of error contribution value 410 can thus include parameters related to pixel errors.

As previously described, a distal object 150 (shown in FIGS. 2 and 7) far from the vision sensor may be measured with a greater error than a nearby object, and distance between the vision sensor and the object 150 is correlated with the binocular disparity d. In addition, when the number n of inlier feature point pairs is small, the small number n can indicate currently-measured feature point(s) are not obvious and/or stable. Thus, the small number n also can indicate a greater pixel error. Thus, the error contribution value 410 can include the number n and/or d.

Further, although not shown in some embodiments, the error contribution value 410 can further include error of the internal reference matrix K and/or the rotation matrix R. A greater error of the internal reference matrix K and/or the rotation matrix R can result in a greater error 420. The error in the internal reference matrix K can be correlated with a reprojection error. Therefore, the reprojection error can be additionally and/or alternatively included in the k7, b7, k8, b8, k9, and/or b9 in Equations (27)-(29), in such a way that the error 420 can be estimated to increase with the reprojection error.

Therefore, process of estimating the error 420 can be faster and consume less computational resource of the processor 400. In addition, as shown in various embodiments in FIGS. 8-15 that are to be described next, the error 420 can be estimated with great accuracy. Thus, after subsequent sensor fusion based on the error 420, the movement 300 of the mobile platform 200 can be accurately calculated. Result of calculating the movement 300 can be stable. As a result, the mobile platform 200 can be controlled by the controller in such a way as to compensate for the movement 300 in order to remain in the hovering state with great stability.

Figure 8:
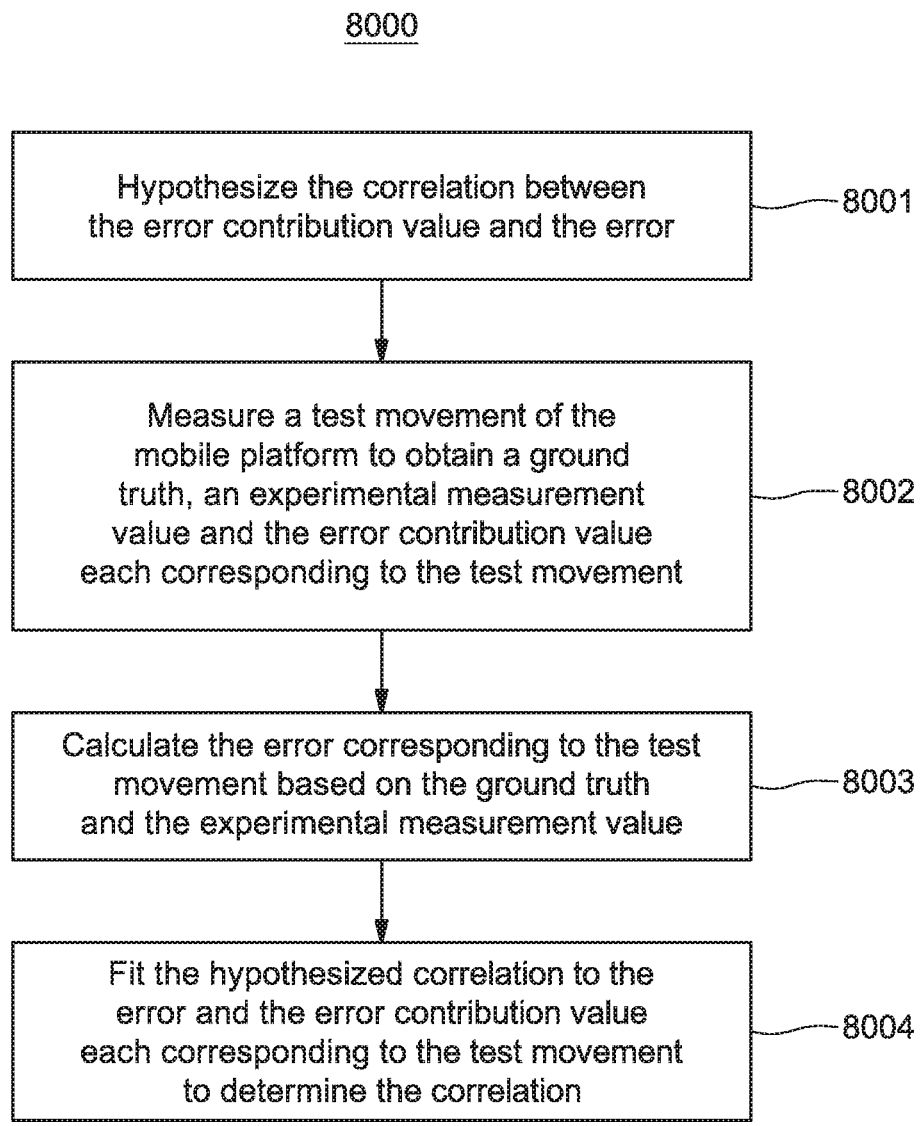
FIG. 8 is an exemplary diagram illustrating another alternative embodiment of the method of FIG. 3, wherein a correlation between an error contribution value and an error is identified.

In various embodiments to be described next, a method for identifying the correlation between the error contribution value 410 and the error 420 are illustrated, and the errors 420 estimated using the disclosed methods can be shown to have a great accuracy. FIG. 8 is an exemplary diagram illustrating another alternative embodiment of the method of FIG. 3, wherein a correlation between the error contribution value 410 and the error 420 are identified.

As shown in FIG. 8, the correlation between the error contribution value 410 and the error 420 are hypothesized at 8001. Hypothesizing the correlation can include hypothesizing a type of the functional relationship, a value of a parameter in the relationship, and/or the error contribution value(s) 410 to be included. For example, a hypothesized form of the correlation can include an assumption including Equations (27)-(29). An exemplary hypothesized correlation can include a parameter having an unknown value. In Equations (27)-(29), k7, b7, k8, b8, k9, and/or b9 can each be a parameter having an unknown constant numerical value.

A ground truth, an experimental measurement value, and an error contribution value 410 each corresponding to a test movement can be collected, at 8002. To implement 8002, the test movement of the mobile platform 200 can be measured. The ground truth can refer to an absolute truth of the test movement. In the method 8000, the ground truth can include a value of the test movement measured using equipment that can have a high accuracy, e.g., an accuracy greater than an accuracy of the first sensor 500. For example, the ground truth can be provided by measuring the test movement using a Vicon motion capture system. The ground truth can include the speed V measured by Vicon, referred to as $\bar{v}$.

At 8002, the vision sensor can measure the test movement and obtain an experimental measurement value v, and can obtain the error contribution value 410. The experimental measurement value can refer to an experimentally-obtained value of the speed V. For example, using the method in FIGS. 4-6, the vision sensor can obtain the number n and the corresponding d.

At 8003, an error 420 of measuring the test movement is calculated based on the ground truth $\bar{v}$ and the experimental measurement value v. A test error of measuring the speed V can be $v_{error}=v-\bar{v}$. In certain cases, an error 420 of the first measurement may include a covariance matrix $\Sigma_{cam}$ (as shown in Equation (3)). As the test error $v_{error}$ is not necessarily the same as variance shown in Equation (3), the variance can be calculated using the follow exemplary process.

In the exemplary process, a plurality of test movements is measured according to 8002. For each measurement, the $v_{error}$ and the corresponding error contribution value 410 such as the number n and/or the binocular disparity d can be obtained. The $1/(nd^2)$ can be sorted according to magnitude. The sorted plurality of $1/(nd^2)$ values can be evenly and/or unevenly divided into m sectors. Within each of the sectors, an average of the $1/(nd^2)$ can be calculated to be the $1/(nd^2)$ of the sector, and an average of the corresponding $v^2$ error can be calculated to be the approximated variance of the sector.

In one example, 3107 test movements can be tested, and the sorted plurality of $1/(nd^2)$ values can be evenly divided into 10 sectors. However, the number of test movements, number of sectors, and methods for obtaining the variance are not limited in the present disclosure.

At 8004, the hypothesized correlation can be fitted to the error of the test movement and the error contribution value of the test movement. The unknown value of the parameter can thus be solved. The correlation can thus be determined. In addition, the extent to which the correlation fits the error of the test movement and the error contribution value of the test movement can indicate validity of the hypothesized correlation.

In some embodiments, 8001 can be optional because the 8004 can identify the correlation by fitting to the error of the test movement and the error contribution value of the test movement, without prior knowledge of the hypothesized correlation.

Figure 9:
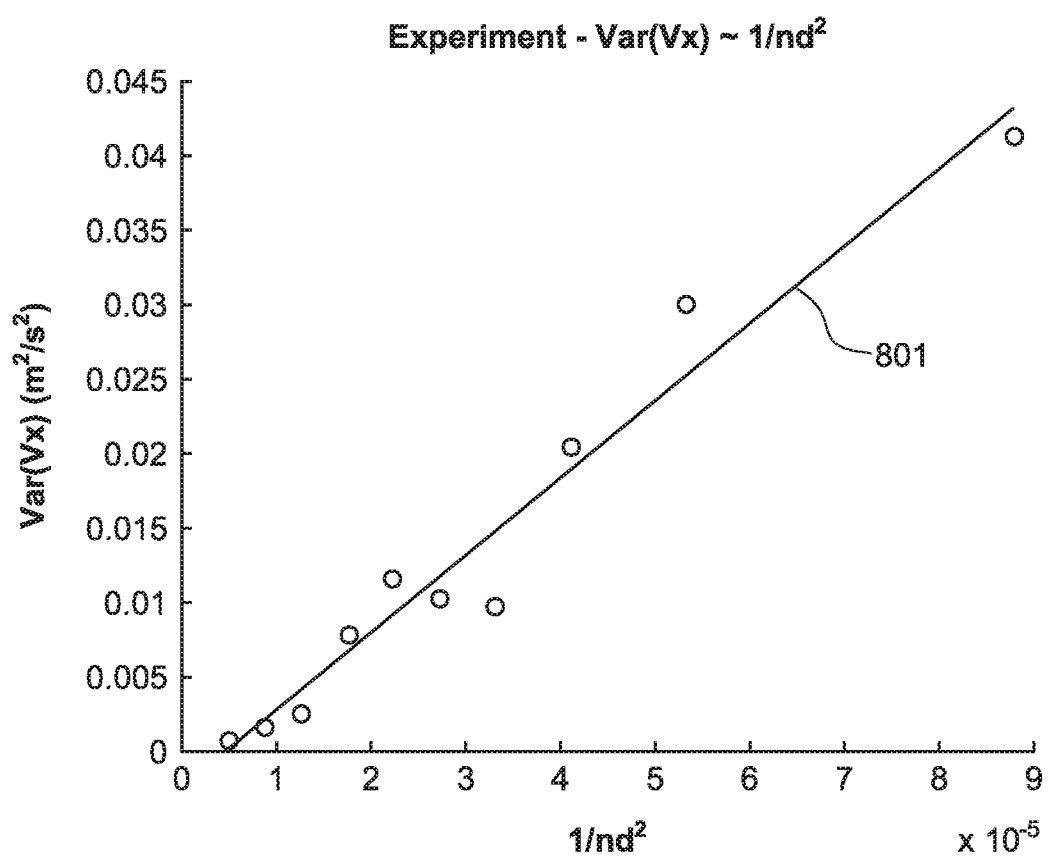
FIGS. 9-11 are exemplary scatter plots illustrating a set of data points for which a correlation is obtained via the method of FIG. 8.
Figure 10:
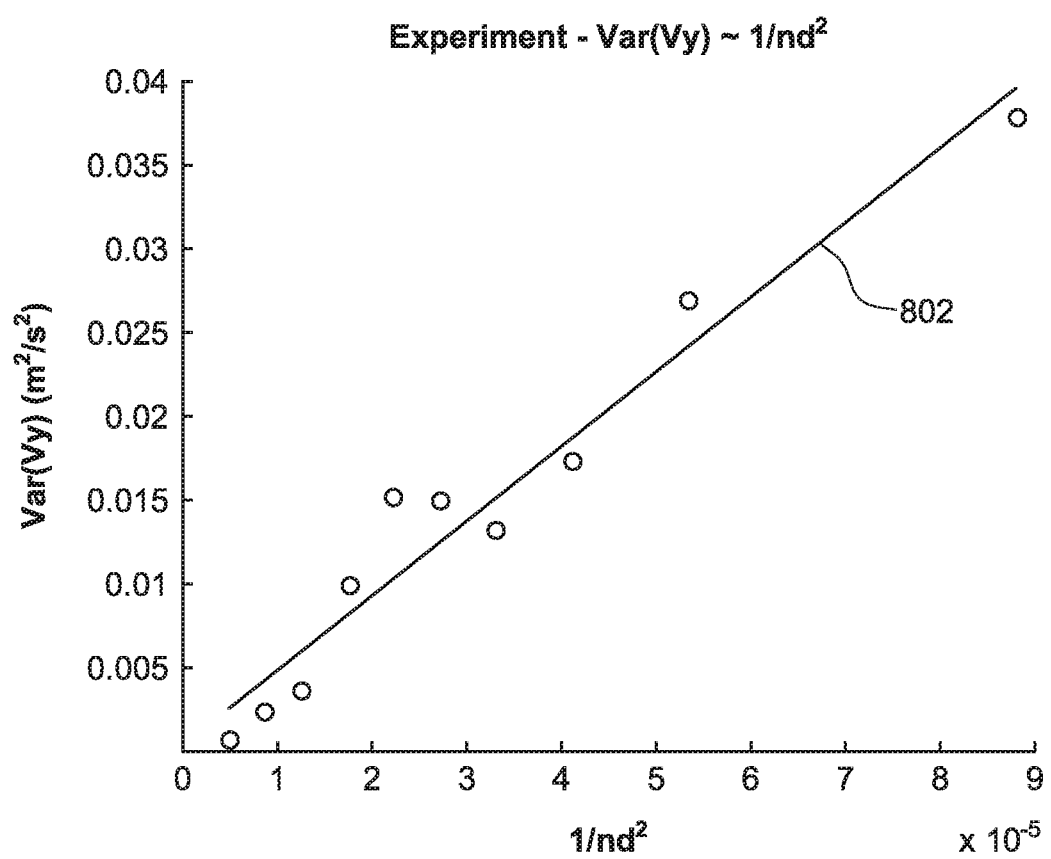
Figure 11:
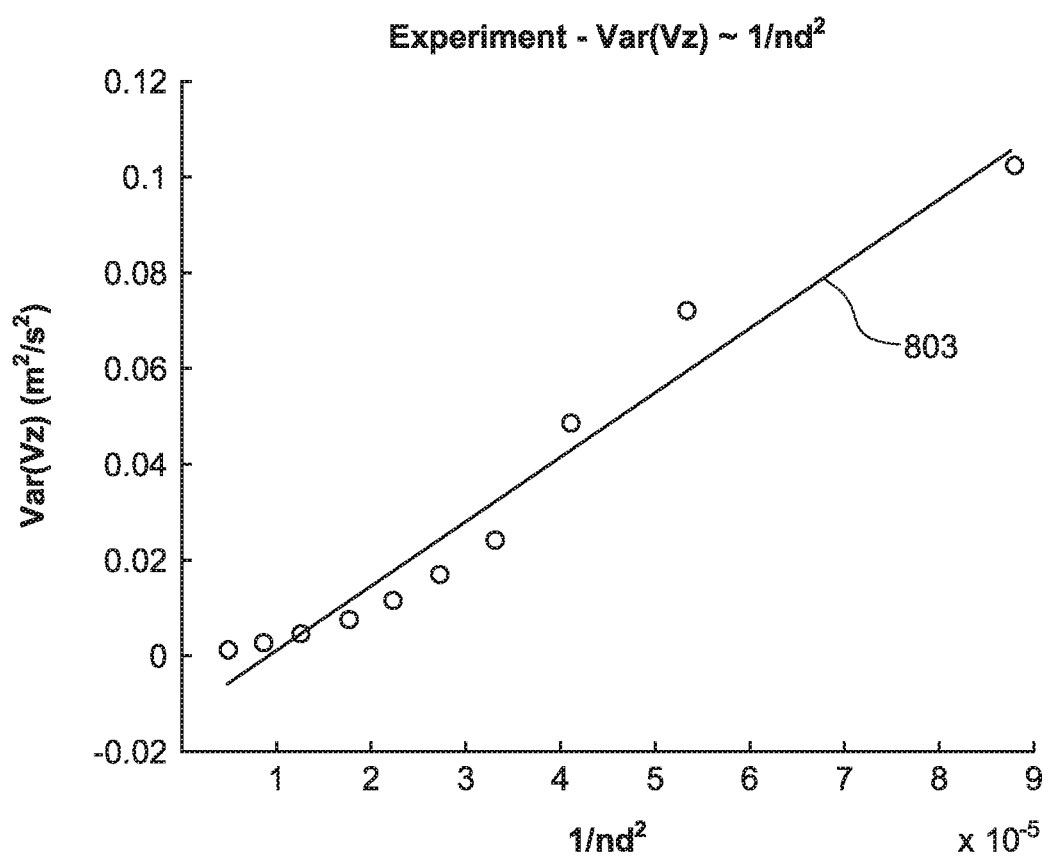

For example, FIGS. 9-11 are exemplary scatter plots illustrating a set of data points for which a correlation is obtained via the method of FIG. 8. The data points in the FIGS. 9-11 are obtained based on the exemplary process as described at 8001-8003. In each of FIGS. 9-11, variance is plotted as a function of $1/(nd^2)$. Any conventional regression method can be used for fitting the hypothesized correlation to identify the functional relationship between variance and $1/(nd^2)$. Respectively in each of FIGS. 9-11, lines 801, 802, and 803 can fit the data points well. The lines 801, 802, and 803 can thus solve the values of k7, b7, k8, b8, k9, and b9, and give the correlation as follows:

$$\text{Var}(Vx) = \frac{516.3}{nd^2} - 0.0025 \text{ m}^2/\text{s}^2$$

$$\text{Var}(Vy) = \frac{446.9}{nd^2} + 0.0003 \text{ m}^2/\text{s}^2$$

$$\text{Var}(Vz) = \frac{1330.5}{nd^2} - 0.0125 \text{ m}^2/\text{s}^2$$

The covariance matrix $\Sigma_{cam}$ (in Equation (3)) can thus be obtained. The covariance matrix $\Sigma_{cam}$ can be transformed into another coordinate system. An exemplary coordinate system can be based on the rotation matrix R, where the transformation can be performed using $\Sigma=R\Sigma_{cam}R^T$.

As the lines 801, 802, and 803 can fit the data points well, the lines 801, 802, and 803 can be used for predicting the correlation between the error 420 and the error contribution value 410 for the system 100 that is similar to the system used for producing the lines 801, 802, and 803 in the method 8000. As illustrated in the example shown in FIGS. 9-11, the correlation between the error contribution value 410 and the error 420 can be a mathematical formula able to be graphically represented as a line and/or curve. The correlation can be enabled to estimate the error 420 of measuring a movement of the mobile platform based on the error contribution value 410 of measuring the movement.

For example, the correlation can be obtained using the system 100 and/or the mobile platform 200 according to method 8000. The processor 400 can then be configured to use the obtained correlation for a measurement that requires estimating the error 420.

Additionally and/or alternatively, a correlation can be respectively obtained from a plurality of the systems 100 and/or the mobile platforms 200. In one example, the processor 400 can be configured to use an average of the correlations obtained. In another example, when difference between the correlations is small, the processor 400 can be configured to use one of the obtained correlations. Criterion of selecting the correlation for the processor 400 from more than one obtained correlations can include any methods, without limitation.

Any entity can perform the method 8000 and configure the processor 400, without limitation. An exemplary entity can include a manufacturer, a tester, a user of the system 100 and/or the mobile platform 200, or the like.

In certain cases, hypothesizing the correlation such as in method 8000 may not be a straightforward process and may require iterative trials. For example, a great number of variables may be candidates of the error contribution value 410. To reduce consumption of experimental resources, a simulation can be performed. The simulation may reveal whether selected variable(s) as the error contribution value 410 correlates with error 420, and/or whether the hypothesized type of mathematical functional relationship is valid.

Figure 12:
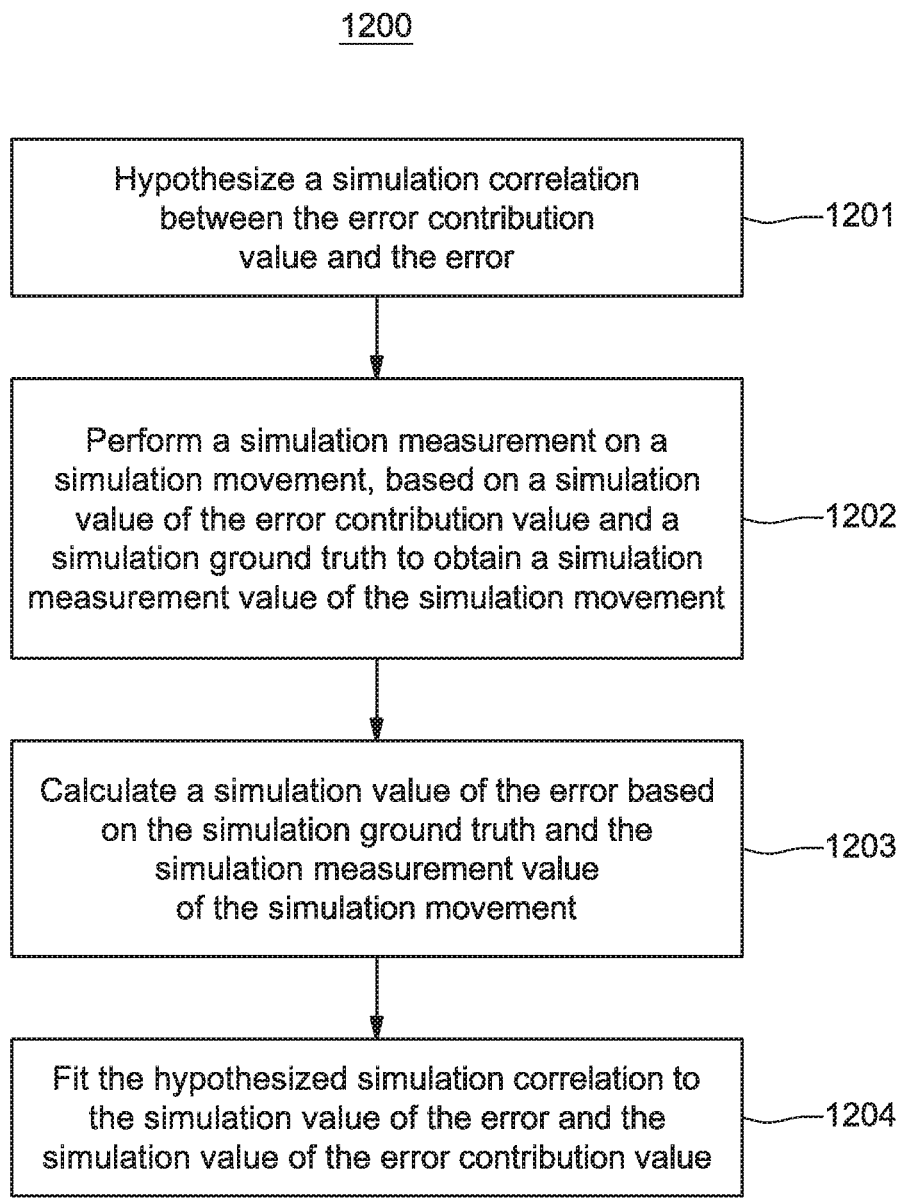
FIG. 12 is an exemplary diagram illustrating another alternative embodiment of the method of FIG. 3, wherein a simulation correlation between an error contribution value and an error is identified.

FIG. 12 is an exemplary diagram illustrating another alternative embodiment of the method of FIG. 3, wherein a simulation correlation between the error contribution value 410 and the error 420 is identified. The method 1200 in FIG. 12 can be performed by simulation using a computer and does not necessarily need experimental hardware.

At 1201, a simulation correlation between the error contribution value 410 and the error 420 is hypothesized. In one example, the simulation correlation can be hypothesized to be the same as Equations (27)-(29).

At 1202, a simulation measurement is performed on a simulation movement, based on a simulation value of the error contribution value 410 and a simulation ground truth, to obtain a simulation measurement value of the simulation movement. A simulation error source can be introduced into the simulation measurement.

For example, the simulation ground truth $T_{truth}$ can include a true value of the displacement T of the simulation movement. An exemplary simulation ground truth $T_{truth}$ can include an arbitrarily-selected rotation matrix R and/or an arbitrarily-selected displacement T between t2 and t1.

To perform the simulation measurement, the simulation value of the error contribution value 410 can be used. An exemplary simulation value of the error contribution value 410 can include an arbitrarily-selected numerical value of the error contribution value 410. In an exemplary simulation measurement, the number n=16, 32, 64, 128, 256, 512. For each value of n, the binocular disparity d is an integer ranging from 2 to 47. Thus, the simulation value can include a plurality of (n, d) pairs.

Thus, for each (n, d) pair, matching feature point pairs can be randomly generated. Each matching feature point pair can include a first feature point in a simulated first sub-image of the first image captured at t1. Based on the d, the first feature point can be generated in a simulated second sub-image of the first image captured at t1. The simulated first sub-image and the simulated second sub-image can be produced by a computer program that simulates a first imaging device and/or a second imaging device.

By triangulation (as shown in FIG. 7), a three-dimensional coordinate P1 of the first feature point can be produced. The simulation movement can be applied to the simulated first imaging device. The first feature point can correspond to the second feature point at t2 after the simulation movement. The second feature point can thus be projected to the first imaging device to produce a coordinate P2 of the second feature point. The simulation measurement value $T_{sim}$ of the simulation movement can be obtained by using the Equation (6).

For each (n, d) pair, the simulation measurement can obtain a plurality of matching feature point pairs. The number of the plurality of matching feature point pairs can be equal to or greater than n. Among the plurality of matching feature point pairs, n matching feature point pairs can be randomly selected as inlier feature point pairs to obtain the $T_{sim}$.

The simulation measurement value of the simulation movement can be close to the simulated ground truth because of the lack of experimental errors. Therefore, the simulation error source can be introduced to cause result of the simulation measurement to deviate from the simulation ground truth, in order to increase the amount of error.

The simulation error source can be introduced in a variety of ways, without limitation. In the exemplary measurement, in each (n, d) pair, each first feature point can have the binocular disparity d value selected from a random number ranging between (d−0.5) and (d+0.5). Thus, a random error of binocular disparity d can be generated and advantageously, average of binocular disparity d can be easily controlled.

Additionally and/or alternatively, after the second feature point is projected to the first imaging device to produce the coordinate P2, the P2 can be rounded to a shorter representation. An exemplary rounding process can reduce the number of significant digits of P2. For example, at least one coordinate number of P2 can be rounded to an integer pixel value by removing digit(s) of the P2 that follows a decimal point of P2. Thus, the rounding process can introduce the simulation error source.

At 1203, a simulation value of the error 420 is calculated based on the simulation ground truth $T_{truth}$ and the simulation measurement value $T_{sim}$ of the simulation movement. An error of measuring the speed V can thus be $T_{error}=T_{truth}-T_{sim}$. An error of measure the speed V can thus be $V_{error}=T_{error}/(t2-t1)$.

Thus, for each (n, d) pair, a variance of measuring the speed V can be calculated. The variance can be used as the simulation value of the error 420.

At 1204, the hypothesized simulation correlation can be fitted to the simulation value of the error 420 and the simulation value of the error contribution value 410. The extent to which the correlation fits the simulation value of the error 420 and the simulation value of the error contribution value 410 can indicate validity of the hypothesized correlation.

In some embodiments, 1201 can be optional because the 1204 can identify the simulation correlation by fitting to the simulation value of the error 420 and the simulation value of the error contribution value 410, without prior knowledge of a hypothesized simulate on correlation.

Figure 13:
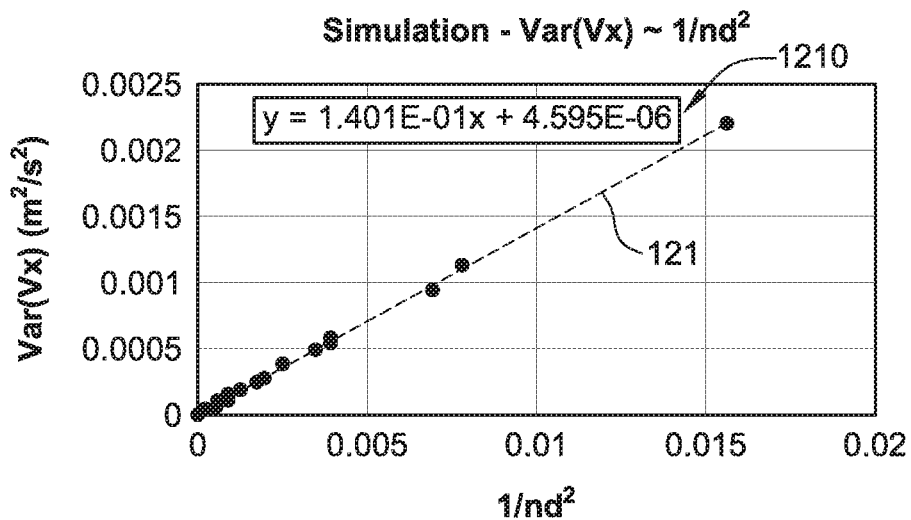
FIGS. 13-15 are exemplary scatter plots illustrating a set of data points for which a simulation correlation is obtained by using the method of FIG. 12.
Figure 14:
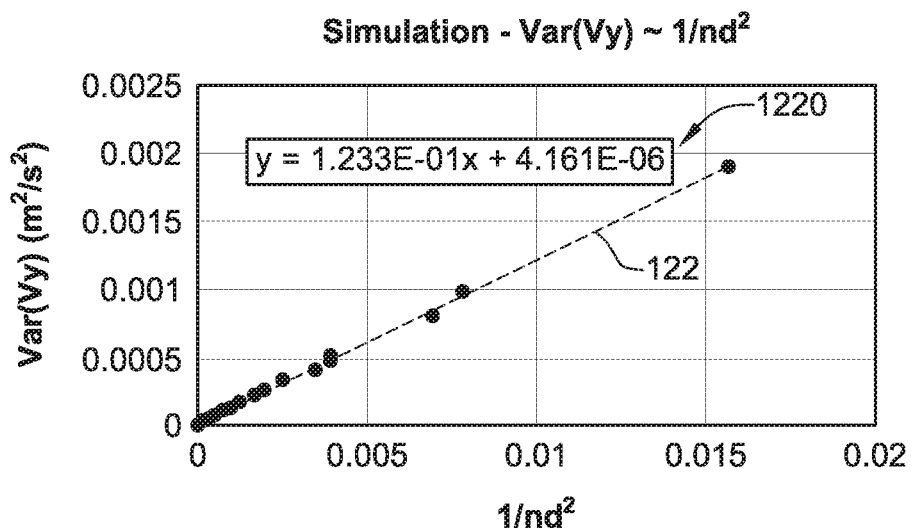
Figure 15:
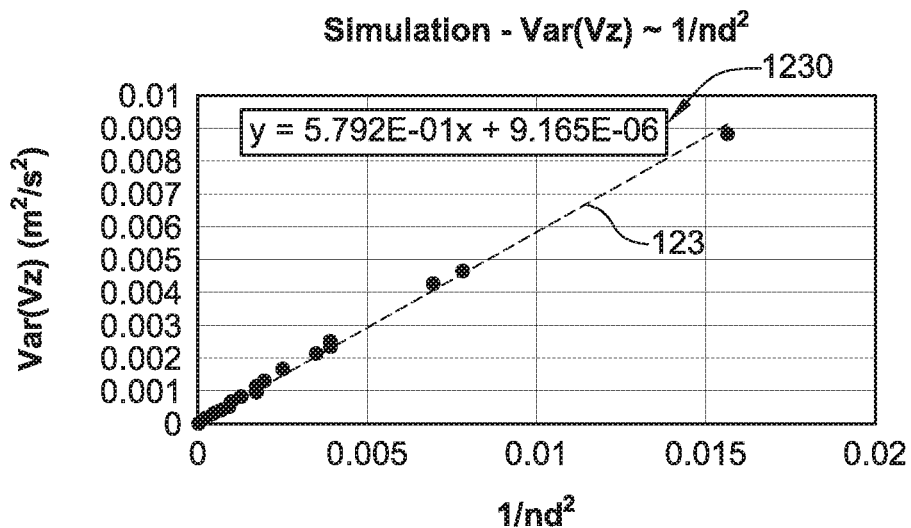

FIGS. 13-15 are exemplary scatter plots illustrating a set of data points for which a simulation correlation is obtained by using the method of FIG. 12. Data points are obtained from the exemplary simulation measurement as described in at 1201-1203. The variance is plotted as a function of $1/(nd^2)$. Any conventional regression method can be used for fitting the hypothesized correlation to identify the functional relationship between variance and $1/(nd^2)$. Respectively in each of FIGS. 13-15, lines 121, 122, and 123 can fit the data points well, corresponding to fitted equations 1210, 1220, 1230, respectively. Therefore, the hypothesized correlation of Equations (27)-(29) may be valid.

Therefore, the method 1200 can be performed to ascertain validity of a hypothesized correlation. Additionally and/or alternatively, the experimental method 8000 can be used to determine the correlation. The methods in FIGS. 8 and 12 can each be implemented on a computer system. The computer system can include a memory and a processor. The memory can have coded instructions thereon. The coded instructions, when executed by the processor, can cause the computer system to implement the processes as illustrated in FIGS. 8 and 12.

The fitting in FIGS. 13-15 may be greater than the fitting in FIGS. 9-11 for various reasons. For example, the variance in FIGS. 9-11 may be an approximated value (as shown at 8003) and is not statistically calculated for each (n, d) pair. Further, the variance in FIGS. 9-11 may be subject to error of the internal reference matrix K and the rotation matrix R that is not necessarily included in the hypothesized correlation in the exemplary example of FIG. 8. The error of the internal reference matrix K may be affected by calibration accuracy of the vision sensor. The error of the rotation matrix R may be affected by measurement accuracy of the IMU.

Further, variance in FIGS. 13-15 may be less than the fitting in FIGS. 9-11, because FIGS. 13-15 has limited source of error in pixel extraction, such as the rounding process. In contrast, FIGS. 9-11 can be subject to random experimental noise in pixel extraction.

In FIGS. 13-15 and FIGS. 9-11, Var(Vx) are similar to Var(Vy). Var(Vz) is significantly greater than Var(Vx) and/or Var(Vy). Such observation is consistent with theoretical basis that measurement error may be greater in the direction of optical axis (i.e., z-axis) of the vision sensor.

Various embodiments further disclose an apparatus for determining the movement 300 of the mobile platform 200. The apparatus can include the processor 400 as shown in FIGS. 1-2.

Various embodiments further disclose an apparatus assembly for determining the movement 300 of the mobile platform 200. The apparatus assembly can include a vision sensor for performing a first measurement of the movement 300 of the mobile platform 200, and the apparatus for determining the movement 300 of the mobile platform 200. The apparatus can be configured to estimate the error 420 of the first measurement.

Various embodiments further disclose an apparatus assembly for determining the movement 300 of the mobile platform 200. The apparatus assembly can include a vision sensor for performing a first measurement of the movement 300 of the mobile platform 200, and the apparatus for determining the movement 300 of the mobile platform 200. The apparatus can be configured to estimate an error 420 of the first measurement. The apparatus assembly can further include an IMU for collecting and/or generating a second measurement of the movement of a mobile platform. The apparatus assembly can be configured to combine the second measurement with the first measurement based upon the error 420 of the first measurement, to determine the movement 300 of the mobile platform 200.

Various embodiments further disclose the mobile platform 200, as shown in FIGS. 1-2. The mobile platform 200 can include the apparatus for determining the movement 300 of the mobile platform 200. The mobile platform 200 can be a UAV.

Various embodiments further disclose the mobile platform 200, as shown in FIGS. 1-2. The mobile platform 200 can include the apparatus assembly for determining the movement 300 of the mobile platform 200. The mobile platform 200 can be a UAV.

Various embodiments further disclose a kit for assembly the mobile platform 200, as shown in FIGS. 1-2. The kit can include the apparatus for determining the movement 300 of the mobile platform 200. In certain embodiments, an instruction manual can be included in the kit. The instruction manual may have instructions thereon. When the instructions are followed, the apparatus for determining the movement 300 of the mobile platform 200 can be assembled into the mobile platform 200 as shown in the present disclosure.

Various embodiments further disclose a kit for assembly the mobile platform 200, as shown in FIGS. 1-2. The kit can include the apparatus assembly for determining the movement 300 of the mobile platform 200. In certain embodiments, an instruction manual can be included in the kit. The instruction manual may have instructions thereon. When the instructions are followed, the apparatus for determining the movement 300 of the mobile platform 200 can be assembled into the mobile platform 200 as shown in the present disclosure.

Figure 16:
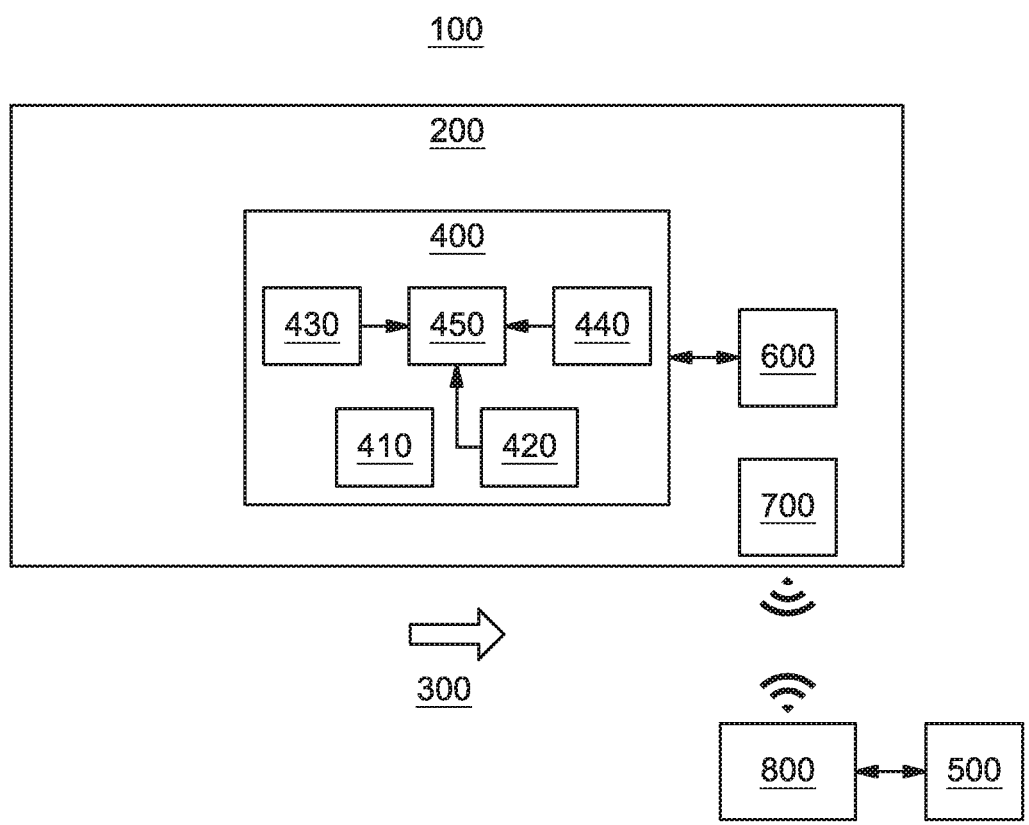
FIG. 16 is an exemplary diagram illustrating an alternative embodiment of the system of FIG. 2, wherein the first sensor and the mobile platform communicate remotely.

Although in certain embodiments, the apparatus assembly and/or the mobile platform 200, such as the UAV, can include the first sensor 500 and/or the second sensor 600, the first sensor 500 and/or the second sensor 600 is not necessarily integrated with the apparatus assembly and/or the mobile platform 200. For example, FIG. 16 is an exemplary diagram illustrating an alternative embodiment of the system 100 of FIG. 2, wherein the first sensor 500 and the mobile platform 200 communicate remotely. As shown in FIG. 16, the first sensor 500 can include the vision sensor. The first sensor 500 can be stationery and located remotely from the mobile platform 200. The first sensor 500 can perform the first measurement by capturing images of the mobile platform 200 as the object 150 of interest. The exemplary methods of FIGS. 3-6, 8 and 12 can be used for calculated the movement 300 of the mobile platform 200. The mobile platform 200 can include a communication module 700. The first sensor 500 can be coupled with a communication module 800. The communication modules 700 and/or 800 can include a transceiver and/or a receiver. The communication modules 700 can be configured to receive the first measurement data 430 from the first sensor 500 via the communication module 800.

In various embodiments, the methods as disclosed can be implemented by software executable via a selected hardware platform, such as a universal hardware platform. Alternatively and/or additionally, the disclosed methods can be implemented by hardware. Part or all of the steps in the methods in accordance with various embodiments can be accomplished using a program (or software) to instruct related hardware.

Therefore, various embodiments further disclose computer program product comprising instructions for determining the movement 300 of the mobile platform in accordance with the methods disclosed herein, e.g., as shown in FIGS. 3-6, 8 and 12. The program/software can be stored in a (non-transitory) computer-readable storage medium including, e.g., Read-Only Memory (ROM), Random Access Memory (RAM), internal memory, register, computer hard disk, removable disk, CD-ROM, optical disk, floppy disk, magnetic disk, or the like. The program/software can include coded instructions to instruct one or more processors on a computer device to execute the methods in accordance with various embodiments.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for determining a movement of a mobile platform through an apparatus that includes a processor, the method comprising:
    obtaining, through the processor, an error contribution value for a measurement of the movement of the mobile platform using a sensor, the error contribution value including at least one parameter, including:
    obtaining, through the processor, the measurement of the movement of the mobile platform based on at least one of a plurality of matching feature point pairs that are generated through data of the sensor;
    obtaining, through the processor, a value of the at least one parameter based on the measurement of the movement of the mobile platform, the at least one parameter including a number of one or more inlier feature point pairs and/or a binocular disparity associated with at least a portion of the one or more inlier feature point pairs, and the one or more inlier feature point pairs being selected from the plurality of matching feature point pairs; and
    determining, through the processor, the error contribution value based on the value of the at least one parameter; and estimating, through the processor based on the error contribution value, an error of the measurement of the movement according to a functional relationship between the error of the measurement of the movement and the error contribution value, thereby obtaining an accurate measurement of the movement of the mobile platform to attain an effective control of the mobile platform.

2. The method of claim 1, wherein the obtaining the measurement of the movement of the mobile platform based on the at least one of the plurality of matching feature point pairs comprises:
identifying the at least one of the plurality of matching feature point pairs comprising a first feature point of an object based upon a first image of the object captured at a first time and a second feature point of the object based upon a second image of the object captured at a second time different from the first time; and
measuring the movement of the mobile platform between the first time and the second time based on a relationship between the first feature point and the second feature point within the at least one of the plurality of matching feature point pairs.

3. The method of claim 2, wherein the functional relationship is independent of an error distribution parameter of a coordinate of the first feature point or the coordinate of the first feature point.

4. The method of claim 2, wherein the obtaining the error contribution value for the measurement of the movement of the mobile platform further comprises obtaining the error contribution value correlated with a distance between the object and the mobile platform.

5. The method of claim 2, wherein the obtaining the error contribution value for the measurement of the movement of the mobile platform comprises obtaining the error contribution value comprising the binocular disparity associated with the first feature point, the binocular disparity being generated based upon two sub-images associated with the first feature point.

6. The method of claim 2, wherein the estimating the error of the measurement of the movement comprises estimating the error of the measurement as increasing linearly with a reciprocal of a square of the binocular disparity.

7. The method of claim 1, wherein the estimating the error of the measurement of the movement comprises estimating a covariance matrix associated with the measurement of the movement.

8. An apparatus for determining a movement of a mobile platform, comprising a processor configured to:
obtain an error contribution value for a measurement of the movement of the mobile platform using a vision sensor, the error contribution value including at least one parameter;
obtain the measurement of the movement of the mobile platform based on at least one of a plurality of matching feature point pairs that are generated through data of the vision sensor;
obtain a value of the at least one parameter based on the measurement of the movement of the mobile platform, the at least one parameter including a number of one or more inlier feature point pairs and/or a binocular disparity associated with at least a portion of the one or more inlier feature point pairs, and the one or more inlier feature point pairs being selected from the plurality of matching feature point pairs;
determine the error contribution value based on the value of the at least one parameter; and estimate, through the error contribution value, an error of the measurement of the movement according to a functional relationship between the error of the measurement of the movement and the error contribution value, thereby obtaining an accurate measurement of the movement of the mobile platform to attain an effective control of the mobile platform.

9. An apparatus assembly, comprising: the vision sensor for generating the measurement of the movement of the mobile platform; and the apparatus of claim 8, for estimating the error of the measurement of the movement.

10. A method for estimating an error of measuring a movement of a mobile platform through an apparatus that includes a processor, the method comprising:
hypothesizing, through the processor, a correlation between an error contribution value and the error of measuring the movement of the mobile platform, the correlation including a functional relationship between the error and the error contribution value and containing an unknown parameter, and the error contribution value including at least one parameter;
collecting, through the processor, an experimental measurement value, a ground truth, and an error contribution value each corresponding to a test movement, the error contribution value of the test movement being generated in a measurement of the test movement by:
obtaining, through the processor, the measurement of the test movement based on at least one of a plurality of matching feature point pairs associated with the test movement;
obtaining, through the processor, a value of the at least one parameter based on the measurement of the test movement, the at least one parameter including a number of one or more inlier feature point pairs and/or a binocular disparity associated with at least a portion of the one or more inlier feature point pairs, and the one or more inlier feature point pairs being selected from the plurality of matching feature point pairs; and
determining, through the processor, the error contribution value of the test movement based on the value of the at least one parameter;
calculating, through the processor, an error of measuring the test movement based on the ground truth of the test movement and the experimental measurement value of the test movement; and
fitting, through the processor, the hypothesized correlation to the error contribution value of the test movement and the error of measuring the test movement, to solve the unknown parameter of the correlation, thereby obtaining an accurate measurement of the movement of the mobile platform to attain an effective control of the mobile platform.

11. The method of claim 10 further comprising enabling the correlation between the error contribution value and the error of measuring the movement of the mobile platform to estimate the error of measuring the movement of the mobile platform based on the error contribution value of measuring the movement.

12. The method of claim 10, further comprising collecting the experimental measurement value by using the at least one of the plurality of matching feature point pairs comprising a first feature point of an object based upon a first image of the object captured at a first time and a second feature point of the object based upon a second image of the object captured at a second time.

13. The method of claim 12, wherein the first time is different from the second time, and the collecting the experimental measurement value comprises measuring the test movement of the mobile platform between the first time and the second time based on a relationship between the first feature point and the second feature point within the at least one of the plurality of matching feature point pairs.

14. The method of claim 12, wherein the hypothesizing the correlation between the error contribution value and the error of measuring the movement of the mobile platform comprises hypothesizing the correlation independent of an error distribution parameter of a coordinate of the first feature point or independent of the coordinate of the first feature point.

15. The method of claim 12, wherein the determining the error contribution value of the test movement comprises determining the error contribution value comprising the binocular disparity associated with the first feature point.

16. The method of claim 15, wherein the hypothesizing the correlation between the error contribution value and the error of measuring the movement of the mobile platform comprises hypothesizing the correlation in which the error of measuring the movement increases linearly with a reciprocal of a square of the binocular disparity.

17. The method of claim 12, wherein the collecting the experimental measurement value comprises:

identifying the plurality of matching feature point pairs each comprising a respective selected first feature point and a corresponding second feature point; and measuring the movement of the mobile platform between the first time and the second time based upon a relationship between the respective selected first feature point and the corresponding second feature point within the one or more inlier feature point pairs selected from the plurality of matching feature point pairs.

18. The method of claim 17, wherein the hypothesizing the correlation between the error contribution value and the error of measuring the movement of the mobile platform comprises hypothesizing the correlation in which the error of measuring the movement increases linearly with a reciprocal of the number of the one or more inlier feature point pairs.

19. The method of claim 17, wherein the collecting the experimental measurement value comprises:

obtaining a sample movement value based on each of the plurality of matching feature point pairs; and measuring the movement of the mobile platform based on the sample movement value provided by most matching feature point pairs of the plurality of matching feature point pairs, wherein the most matching feature point pairs are the one or more inlier feature point pairs.

* * * * *